(12) United States Patent
Overbeek et al.

(10) Patent No.: US 12,503,435 B2
(45) Date of Patent: Dec. 23, 2025

(54) AZIRIDINE FUNCTIONAL COMPOUND

(71) Applicant: COVESTRO (NETHERLANDS) B.V., Geleen (NL)

(72) Inventors: Gerardus Cornelis Overbeek, Geleen (NL); Patrick Johannes Maria Stals, Geleen (NL); Daan Van Der Zwaag, Geleen (NL); Alfred Jean Paul Bückmann, Geleen (NL); Josephus Christiaan Van Oorschot, Geleen (NL); Ronald Tennebroek, Geleen (NL)

(73) Assignee: Covestro (Netherlands) B.V., Geleen (NL)

( * ) Notice: Subject to any disclaimer, the term of this patent is extended or adjusted under 35 U.S.C. 154(b) by 764 days.

(21) Appl. No.: 17/792,078

(22) PCT Filed: Jan. 21, 2021

(86) PCT No.: PCT/EP2021/051382
§ 371 (c)(1),
(2) Date: Jul. 11, 2022

(87) PCT Pub. No.: WO2021/148561
PCT Pub. Date: Jul. 29, 2021

(65) Prior Publication Data
US 2023/0140764 A1    May 4, 2023

(30) Foreign Application Priority Data

Jan. 22, 2020 (EP) .................................... 20153154
Jan. 22, 2020 (EP) .................................... 20153159
Jan. 22, 2020 (EP) .................................... 20153239
Jan. 22, 2020 (EP) .................................... 20153240
Jan. 22, 2020 (EP) .................................... 20153242
(Continued)

(51) Int. Cl.
*C07D 203/10* (2006.01)
*C07D 251/32* (2006.01)
(Continued)

(52) U.S. Cl.
CPC ......... *C07D 203/10* (2013.01); *C07D 251/32* (2013.01); *C07D 403/12* (2013.01);
(Continued)

(58) Field of Classification Search
CPC .................................................. C07D 203/10
See application file for complete search history.

(56) References Cited

U.S. PATENT DOCUMENTS 3,329,674 A   7/1967 Bulbenko et al.
3,337,533 A   8/1967 Ham
(Continued)

FOREIGN PATENT DOCUMENTS

CN    1368524 A    9/2002
CN    1606574 A    4/2005
(Continued)

OTHER PUBLICATIONS

International Search Report for PCT/EP2021/051382 dated Mar. 1, 2021, 5 pages.
(Continued)

*Primary Examiner* — Peter F Godenschwager
(74) *Attorney, Agent, or Firm* — The Webb Law Firm

(57) ABSTRACT

The present application relates to aziridine functional compounds with reduced genotoxicity and good crosslinking efficiency, for use in the preparation of, for example, coatings.

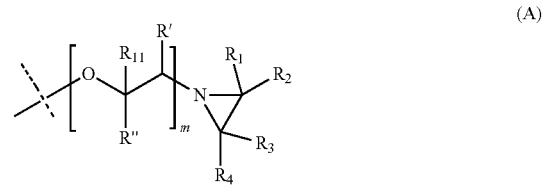

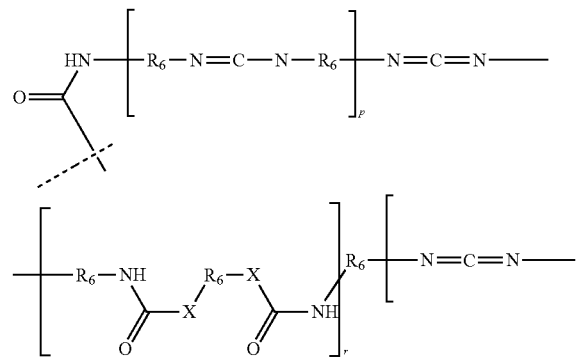

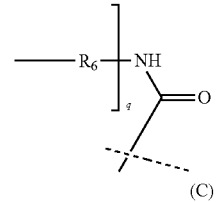

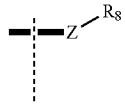

19 Claims, No Drawings

(30) Foreign Application Priority Data

| | | | |
|---|---|---|---|
| Jan. 22, 2020 | (EP) | ...................................... | 20153245 |
| Jan. 22, 2020 | (EP) | ...................................... | 20153246 |
| Jan. 22, 2020 | (EP) | ...................................... | 20153249 |
| Jan. 22, 2020 | (EP) | ...................................... | 20153250 |
| Jan. 22, 2020 | (EP) | ...................................... | 20153251 |
| Jan. 22, 2020 | (EP) | ...................................... | 20153253 |
| Jan. 24, 2020 | (EP) | ...................................... | 20153628 |
| Jan. 24, 2020 | (EP) | ...................................... | 20153630 |

(51) Int. Cl.

| | |
|---|---|
| C07D 403/12 | (2006.01) |
| C07D 403/14 | (2006.01) |
| C07D 413/14 | (2006.01) |
| C07D 487/14 | (2006.01) |
| C08F 220/18 | (2006.01) |
| C08G 18/02 | (2006.01) |
| C08G 18/08 | (2006.01) |
| C08G 18/12 | (2006.01) |
| C08G 18/22 | (2006.01) |
| C08G 18/24 | (2006.01) |
| C08G 18/28 | (2006.01) |
| C08G 18/30 | (2006.01) |
| C08G 18/32 | (2006.01) |
| C08G 18/34 | (2006.01) |
| C08G 18/38 | (2006.01) |
| C08G 18/42 | (2006.01) |
| C08G 18/44 | (2006.01) |
| C08G 18/48 | (2006.01) |
| C08G 18/66 | (2006.01) |
| C08G 18/67 | (2006.01) |
| C08G 18/73 | (2006.01) |
| C08G 18/75 | (2006.01) |
| C08G 18/76 | (2006.01) |
| C08G 18/79 | (2006.01) |
| C08G 18/83 | (2006.01) |
| C08K 5/3412 | (2006.01) |
| C08K 5/3492 | (2006.01) |
| C08L 63/00 | (2006.01) |
| C09D 7/20 | (2018.01) |
| C09D 7/45 | (2018.01) |
| C09D 7/63 | (2018.01) |
| C09D 7/65 | (2018.01) |
| C09D 11/101 | (2014.01) |
| C09D 133/02 | (2006.01) |
| C09D 133/04 | (2006.01) |
| C09D 175/04 | (2006.01) |
| C09D 175/08 | (2006.01) |
| C09D 175/12 | (2006.01) |

(52) U.S. Cl.
CPC ......... *C07D 403/14* (2013.01); *C07D 413/14* (2013.01); *C07D 487/14* (2013.01); *C08F 220/1804* (2020.02); *C08G 18/027* (2013.01); *C08G 18/0823* (2013.01); *C08G 18/0866* (2013.01); *C08G 18/12* (2013.01); *C08G 18/227* (2013.01); *C08G 18/246* (2013.01); *C08G 18/282* (2013.01); *C08G 18/2825* (2013.01); *C08G 18/283* (2013.01); *C08G 18/2865* (2013.01); *C08G 18/2875* (2013.01); *C08G 18/302* (2013.01); *C08G 18/3228* (2013.01); *C08G 18/3231* (2013.01); *C08G 18/3275* (2013.01); *C08G 18/348* (2013.01); *C08G 18/3842* (2013.01); *C08G 18/4291* (2013.01); *C08G 18/44* (2013.01); *C08G 18/4808* (2013.01); *C08G 18/4825* (2013.01); *C08G 18/4854* (2013.01); *C08G 18/4862* (2013.01); *C08G 18/4879* (2013.01); *C08G 18/6692* (2013.01); *C08G 18/6715* (2013.01); *C08G 18/73* (2013.01); *C08G 18/755* (2013.01); *C08G 18/758* (2013.01); *C08G 18/765* (2013.01); *C08G 18/792* (2013.01); *C08G 18/798* (2013.01); *C08G 18/833* (2013.01); *C08K 5/3412* (2013.01); *C08K 5/34924* (2013.01); *C08K 5/34926* (2013.01); *C08L 63/00* (2013.01); *C09D 7/20* (2018.01); *C09D 7/45* (2018.01); *C09D 7/63* (2018.01); *C09D 7/65* (2018.01); *C09D 11/101* (2013.01); *C09D 133/02* (2013.01); *C09D 133/04* (2013.01); *C09D 175/04* (2013.01); *C09D 175/08* (2013.01); *C09D 175/12* (2013.01); *C08G 2150/00* (2013.01)

(56) References Cited

U.S. PATENT DOCUMENTS

| | | | |
|---|---|---|---|
| 3,523,750 | A | 8/1970 | Tesoro |
| 3,560,415 | A | 2/1971 | Grögler et al. |
| 3,583,977 | A | 6/1971 | Uelzmann |
| 3,763,132 | A | 10/1973 | Meiser |
| 3,933,936 | A | 1/1976 | Smith et al. |
| 4,605,698 | A | 8/1986 | Briden |
| 5,106,993 | A | 4/1992 | Kania |
| 5,133,997 | A | 7/1992 | Maier et al. |
| 5,164,467 | A | 11/1992 | Kania |
| 5,241,001 | A | 8/1993 | Kania et al. |
| 5,258,481 | A | 11/1993 | Hesselmans et al. |
| 5,359,005 | A | 10/1994 | Kania et al. |
| 5,712,331 | A | 1/1998 | Ryang |
| 7,294,449 | B1 | 11/2007 | Guideman et al. |
| 7,396,891 | B2 | 7/2008 | Gray et al. |
| 8,318,855 | B2 | 11/2012 | Schafheutle et al. |
| 2003/0229176 | A1 | 12/2003 | Trombetta et al. |
| 2006/0117991 | A1 | 6/2006 | Mayo et al. |
| 2006/0148980 | A1 | 7/2006 | Tielemans et al. |
| 2007/0298006 | A1 | 12/2007 | Tomalia et al. |
| 2008/0114096 | A1 | 5/2008 | Qu et al. |
| 2010/0227945 | A1 | 9/2010 | Bissinger et al. |
| 2011/0086180 | A1 | 4/2011 | Tielemans |
| 2015/0118501 | A1 | 4/2015 | Lu et al. |
| 2017/0218110 | A1 | 8/2017 | Arzt et al. |

FOREIGN PATENT DOCUMENTS

| | | |
|---|---|---|
| CN | 1720223 A | 1/2006 |
| CN | 1823110 A | 8/2006 |
| CN | 101365688 A | 2/2009 |
| CN | 101437863 A | 5/2009 |
| CN | 101619164 A | 1/2010 |
| CN | 102046688 A | 5/2011 |
| CN | 104080861 A | 10/2014 |
| CN | 104379618 A | 2/2015 |
| CN | 105143297 A | 12/2015 |
| CN | 105377918 A | 3/2016 |
| CN | 105705598 A | 6/2016 |
| CN | 107922762 A | 4/2018 |
| CN | 108084870 | 5/2018 |
| CN | 110023354 A | 7/2019 |
| CN | 110248977 A | 9/2019 |
| CN | 110607120 A | 12/2019 |
| CN | 112469755 A | 3/2021 |
| CN | 117015566 A | 11/2023 |
| CN | 117836343 A | 4/2024 |
| EP | 0 507 407 | 10/1992 |
| EP | 0 758 662 | 2/1997 |
| EP | 1 865 014 | 12/2007 |
| GB | 1344725 | 1/1974 |
| JP | 47-027971 | 8/1972 |
| JP | 51-141860 | 5/1976 |

(56) References Cited

FOREIGN PATENT DOCUMENTS

| | | |
|---|---|---|
| JP | 59-128291 | 7/1984 |
| JP | 11-500152 | 1/1999 |
| JP | 2012-529473 | 11/2012 |
| JP | 2015-505889 | 2/2015 |
| KR | 1020060066442 A | 6/2006 |
| NL | 9100578 | 4/1992 |
| WO | 2006/115547 | 11/2006 |
| WO | 2008069298 A1 | 6/2008 |
| WO | 2013/089927 | 6/2013 |
| WO | 2015/066868 | 5/2015 |
| WO | 2017216767 A1 | 12/2017 |
| WO | 2020/020714 | 1/2020 |

OTHER PUBLICATIONS

Written Opinion of the ISA for PCT/EP2021/051382 dated Mar. 1, 2021, 7 pages.

Dahlquist et al., "Contact allergy to trimethylolpropane triacrylate (TMPTA) in an aziridine plastic hardener", Contact Dermatitis, 1983, pp. 122-124, vol. 9.

Fei et al., "Properties and Curing Kinetic of Acrylic Resin Cured with Aziridine Crosslinker", Chinese Journal of Synthetic Chemistry, 2002, pp. 120-125, vol. 10, Issue 2.

Haitao et al., "Synthesis and Application of Aziridine Crosslinking Agent in Waterborne Coatings", Shanghai Coatings, 2013, 7 pages, vol. 51, No. 10.

Jiao, "Preparation of Waterborne Polyurethane Based on Renewable Resources and Its Film Properties", Masteral Dissertation, Dalian University of Technology, 2010, 79 pages.

Lee et al., "Preparation and characterization of acrylic pressure-sensitive adhesives based on UV and heat curing systems", International Journal of Adhesion and Adhesives, 2017, 21 pages.

Qingfang et al., "Study on heat resistance of polyurethane-imide/organosilicon modified epoxy coatings", Synthetic Materials and Applications, 2018, 5 pages, vol. 47, No. 3.

Walsh et al., "Polyamine-Functional Sterically Stabilized Latexes for Covalently Cross-Linkable Colloidosomes", Langmuir, 2010, pp. 18039-18048, vol. 26(23).

Wang et al., "Pervaporation Properties to Aromatic/Non-Aromatic Hydrocarbon Mixtures of Cross-Linked Membranes of Copoly(methacrylates) with Pendant Phosphate and Carbamoylphosphonate Groups", Journal of Membrane Science, 2002, pp. 13-27, vol. 199.

Yoo et al., "Preparation of Acrylic Copolymers and Crosslinking Agents and Properties as a Film", Journal of Applied Polymer Science, 2009, pp. 1587-1594, vol. 112.

Zilin et al., "Effect of Crosslinking Agent on Waterborne Polyurethane Wet Friction Fixing Agent", Shandon Chemical Industry, 2019, pp. 1-4, vol. 8, Issue 14.

AZIRIDINE FUNCTIONAL COMPOUND

This application is the U.S. national phase of International Application No. PCT/EP2021/051382 filed Jan. 21, 2021 which designated the U.S. and claims priority to, EP 20187717.2 filed Jul. 24, 2020, EP 20153628.1 filed Jan. 24, 2020, EP 20153630.7 filed Jan. 24, 2020, EP 20153154.8 filed Jan. 22, 2020, EP 20153159.7 filed Jan. 22, 2020, EP 20153239.7 filed Jan. 22, 2020, EP 20153240.5 filed Jan. 22, 2020, EP 20153242.1 filed Jan. 22, 2020, EP 20153245.4 filed Jan. 22, 2020, EP 20153246.2 filed Jan. 22, 2020, EP 20153249.6 filed Jan. 22, 2020, EP 20153250.4 filed Jan. 22, 2020, EP 20153251.2 filed Jan. 22, 2020, EP 20153253.8 filed Jan. 22, 2020, the entire contents of each of which are hereby incorporated by reference.

The present invention relates to aziridine functional compounds which can be used for example for crosslinking of for example carboxylic acid functional polymers dissolved and/or dispersed in an aqueous medium.

Over the years, the need for coatings with improved resistances, like stain and solvent resistance, improved mechanical properties and improved adhesive strength is more and more growing. One or more of those properties can be elevated to a higher level by means of crosslinking. Many crosslink mechanisms have been studied over the years and for waterborne dispersions, the most useful ones include isocyanate crosslinking of hydroxyl functional dispersions, the reaction between carbodiimide and carboxylic acid, epoxy crosslinking and crosslinking using aziridine based crosslinkers.

US-A-5133997 describes coating compositions comprising an aqueous dispersion of linear aliphatic urethane resins, an anionic surfactant and a crosslinking agent capable of facilitating the cure of said resin. Trimethylolpropane tris (2-methyl-1-aziridinepropionate), CAS number 64265-57-2, a polyfunctional aziridine crosslinker, is used as crosslinking agent, which is a well-known and very active for crosslinking carboxylic acid functional polymers. This crosslinker however has an unfavourable genotoxic profile. There is a need in the industry to improve the safety, health and environmental profile of adhesives, inks and coatings and also of the substances used for preparing adhesives, inks and coatings. Genotoxicity describes the property of chemical or physical agents that cause any type of DNA damage, which may not always lead to a transmittable mutation. Mutagenicity refers to the induction of permanent transmissible DNA changes (as DNA composition or chromosome structure), which are retained in somatic cell division and passed onto progeny in germ cells. Genotoxicity must not be confused with mutagenicity. All mutagens are genotoxic whereas not all genotoxic substances are mutagenic.

The object of the present invention is to provide an aziridine functional crosslinking compound which has reduced genotoxicity compared to trimethylolpropane tris (2-methyl-1-aziridinepropionate) and with good crosslinking efficiency.

This object has surprisingly been achieved by providing an aziridine compound having:
a) one or two of the following structural units A:

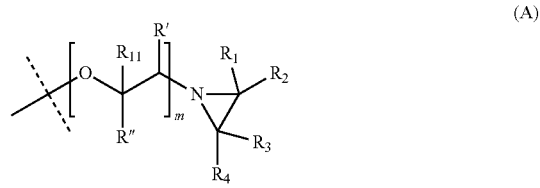

wherein
$R_1$ is H;
$R_2$ and $R_4$ are independently chosen from H or an aliphatic hydrocarbon group containing from 1 to 4 carbon atoms;
$R_3$ is an aliphatic hydrocarbon group containing from 1 to 4 carbon atoms;
R' and R" are according to (1) or (2):
  (1) R'=H or an aliphatic hydrocarbon group containing from 1 to 14 carbon atoms, and
    R"=H, an aliphatic hydrocarbon group containing from 5 to 14 carbon atoms, a cycloaliphatic hydrocarbon group containing from 5 to 12 carbon atoms, an aromatic hydrocarbon group containing from 6 to 12 carbon atoms, $CH_2$—O—(C=O)—R''', $CH_2$—O—R'''', or $CH_2$—(OCR''''' HCR'''''H)$_n$—OR'''''', whereby R''' is an aliphatic hydrocarbon group containing from 4 to 14 carbon atoms and R'''' is an aliphatic hydrocarbon group containing from 1 to 14 carbon atoms or an aromatic hydrocarbon group containing from 6 to 12 carbon atoms, n being from 1 to 35, R''''' independently being H or an aliphatic hydrocarbon group containing from 1 to 14 carbon atoms and R'''''' being an aliphatic hydrocarbon group containing from 1 to 4 carbon atoms,
  (2) R' and R" form together a saturated cycloaliphatic hydrocarbon group containing from 5 to 8 carbon atoms,
$R_{11}$ is H or an aliphatic hydrocarbon group containing from 1 to 14 carbon atoms, preferably $R_{11}$ is H or methyl,
m is an integer from 1 to 6;
b) one structural unit B:

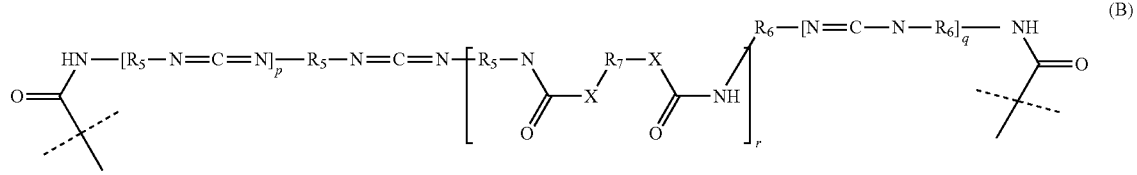

wherein p+q is an integer from 0 to 4;

r is an integer from 0 to 2;

X is NR, NH or O, wherein R contains at most 36 carbon atoms and optionally contains one or more heteroatoms;

$R_5$ and $R_6$ are independently containing from 4 to 13 carbon atoms;

$R_7$ is divalent group;

c) optionally one structural unit C:

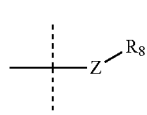

(C)

wherein

Z is NR, NH or O, wherein R contains at most 36 carbon atoms and optionally contains one or more heteroatoms;

$R_8$ is a monovalent group; and d) structural formula A-B-A (i.e. the structural unit B of the aziridine compound is linked to two structural units A) or structural formula A-B-C (i.e. the structural unit B of the aziridine compound is linked to one structural unit A and to structural unit C);

e) a molecular weight higher than 600 Daltons and at most 5000 Daltons; with the proviso that the starting materials to provide structural units A, B and C are chosen such that f) the mathematical sum of the molar mass of starting diisocyanate providing carbodiimide functionality in the structural unit B+the molar mass of structural unit A+the molar mass of structural unit A is higher than 600 Daltons; and g) in case structural unit C is present (i.e. the aziridine compound is according to structural formula A-B-C), the mathematical sum of the molar mass of starting diisocyanate providing carbodiimide functionality in the structural unit B+the molar mass of structural unit A+the molar mass of structural unit C is higher than 600 Daltons.

It has surprisingly been found that the compounds according to the invention have reduced genotoxicity compared to trimethylolpropane tris(2-methyl-1-aziridinepropionate). The compounds according to the invention show either only weakly positive induced genotoxicity or even they do not show genotoxicity, i.e. they show a genotoxicity level comparable with the naturally occurring background, while still having sufficient crosslinking efficiency. A compound with at least one aziridinyl group and at least one carbodiimide group are further referred herein as aziridine functional carbodiimide compound. Both the aziridine and carbodiimide functionality are reactive towards carboxylate groups and acid base interaction of the aziridine with the carboxylate group provides inherently close proximity of both the aziridine and carbodiimide groups enhancing the crosslinking.

EP0507407 describes multifunctional water-dispersible crosslink agents which is an oligomeric material containing carbodiimide functionalities and reactive functional groups which are different from said carbodiimide functional group. It is said in this patent publication that compounds with both carbodiimide functions and aziridine functions are mutagenic and hence genotoxic.

The genotoxicity can be measured by the ToxTracker® assay (Toxys, Leiden, the Netherlands) as further described herein. The ToxTracker® assay can be applied for pure substances or for compositions which are the direct products obtained in the preparation of the aziridine functional carbodiimide compounds of the invention. With positive induced genotoxicity is meant that the induction level of the biomarkers Bscl2-GFP and Rtkn-GFP is equal to or higher than 2-fold at at least one of 10, 25 and 50% cytotoxicity in the absence or presence of the metabolizing system rat S9 liver extract. With weakly positive induced genotoxicity is meant that the induction level of the biomarkers Bscl2-GFP and Rtkn-GFP is higher than 1.5-fold and lower than 2-fold at at least one of 10, 25 and 50% cytotoxicity (but lower than 2-fold at 10, 25 and 50% cytotoxicity) in the absence or presence of rat S9 liver extract-based metabolizing systems (aroclor1254-induced rats, Moltox, Boone, NC, USA). With genotoxicity comparable with the naturally occurring background is meant that the induction level of the biomarkers Bscl2-GFP and Rtkn-GFP is less than or equal to 1.5-fold at 10, 25 and 50% cytotoxicity in the absence and presence of rat S9 liver extract-based metabolizing systems (aroclor1254-induced rats, Moltox, Boone, NC, USA). The induction level of the genotoxicity reporters Bscl2-GFP and Rtkn-GFP is preferably less than or equal to 1.5-fold at 10, 25 and 50% cytotoxicity in the absence and presence of rat S9 liver extract-based metabolizing systems (aroclor1254-induced rats, Moltox, Boone, NC, USA). A substance showing an induction level less than or equal to 1.5-fold at 10, 25 and 50% cytotoxicity in the absence and presence of rat S9 liver extract-based metabolizing systems (aroclor1254-induced rats, Moltox, Boone, NC, USA) is not genotoxic. Crosslinking efficiency of a crosslinker can be assessed by assessing the chemical resistance determined as described below.

For all upper and/or lower boundaries of any range given herein, the boundary value is included in the range given, unless specifically indicated otherwise. Thus, when saying from x to y, means including x and y and also all intermediate values.

The term "coating composition" encompasses, in the present description, paint, coating, varnish, adhesive and ink compositions, without this list being limiting. The term "aliphatic hydrocarbon group" refers to optionally branched alkyl, alkenyl and alkynyl group. The term "cycloaliphatic hydrocarbon group" refers to cycloalkyl and cycloalkenyl group optionally substituted with at least one aliphatic hydrocarbon group. The term "aromatic hydrocarbon group" refers to a benzene ring optionally substituted with at least one aliphatic hydrocarbon group. These optional aliphatic hydrocarbon group substituents are preferably alkyl groups. Examples of cycloaliphatic hydrocarbon groups with 7 carbon atoms are cycloheptyl and methyl substituted cyclohexyl. An example of an aromatic hydrocarbon group with 7 carbon atoms is methyl substituted phenyl. Examples of aromatic hydrocarbon groups with 8 carbon atoms are xylyl and ethyl substituted phenyl.

The aziridine functional carbodiimide compound according to the invention is usually obtained in a composition in which, next to the aziridine functional carbodiimide compound, remaining starting materials, side-products and/or solvent used in the preparation of the aziridine functional carbodiimide compound may be present. The composition may contain only one aziridine functional carbodiimide compound according to the invention but may also contain more than one aziridine functional carbodiimide compound according to the invention. Mixtures of aziridine functional carbodiimide compounds are for example obtained when a mixture of diisocyanates is used as starting material to form the carbodiimide bonds in structural unit B.

Whilst the two structural units A may independently have different $R_2$, $R_3$, $R_4$, R', R", $R_{11}$ and/or m in case the aziridine functional carbodiimide compound of the invention has two structural units A, the structural units A are preferably identical to each other.

The aziridine functional carbodiimide compound according to the invention contains 1 or 2 structural units A, preferably 2 structural units A.

$R_1$ is H. $R_2$ and $R_4$ are independently chosen from H or an aliphatic hydrocarbon group containing from 1 to 4 carbon atoms. Preferably, $R_2$ and $R_4$ are independently chosen from H or an aliphatic hydrocarbon group containing from 1 to 2 carbon atoms. $R_3$ is an aliphatic hydrocarbon group containing from 1 to 4 carbon atoms, preferably an aliphatic hydrocarbon group containing from 1 to 2 carbon atoms. In an embodiment of the invention, $R_1$ is H, $R_2$ is H, $R_3$ is $C_2H_5$ and $R_4$ is H. In another and more preferred embodiment of the invention, $R_1$ is H, $R_2$ is H, $R_3$ is $CH_3$ and $R_4$ is $CH_3$. In another and even more preferred embodiment of the invention, $R_1$ is H, $R_2$ is H, $R_3$ is $CH_3$ and $R_4$ is H.

m is an integer from 1 to 6, preferably m is from 1 to 4, more preferably m is 1 or 2 and most preferably m is 1.

Preferably, R' and R" are according to (1) or (2):
(1) R'=H;
R"=H, an aliphatic hydrocarbon group containing from 5 to 10 carbon atoms, CH2—O—(C=O)—R'", CH2—O—R"", or CH2—(OCR'""HCR'""H)n-OR'"'"', whereby R'" is an alkyl group containing from 4 to 14 carbon atoms and R"" is an alkyl group containing from 1 to 14 carbon atoms, n being from 1 to 35, R'"" independently being H or a methyl group and R'"'"' being an alkyl group containing from 1 to 4 carbon atoms;
(2) R' and R" form together a saturated cycloaliphatic hydrocarbon group containing from 5 to 8 carbon atoms.

$R_{11}$ is H or an aliphatic hydrocarbon group containing from 1 to 14 carbon atoms, preferably $R_{11}$ is H or methyl.

More preferably, R' is H and R" is an alkyl group containing from 5 to 10 carbon atoms, CH2—O—(C=O)—R'", CH2—O—R"", or CH2—(OCH2CH2)n-OCH3, whereby R'" is an alkyl group containing from 4 to 12 carbon atoms, such as for example neopentyl or neodecyl. Most preferably R'" is a branched C9 alkyl. R"" is preferably an alkyl group containing from 4 to 14 carbon atoms, more preferably from 1 to 12 carbon atoms. Non-limited examples for R"" are butyl and 2-ethylhexyl.

The aziridine functional carbodiimide compound according to the invention contains 1 structural unit B linked to at least one structural unit A. The structural unit B present in the aziridine functional carbodiimide compound according to the invention is either linked to one structural unit A and linked to one structural unit C or is linked to two structural units A. In case the structural unit B present in the aziridine functional carbodiimide compound according to the invention is linked to 1 structural unit A and also linked to structural unit C, i.e. the aziridine functional carbodiimide compound has the configuration A-B-C, it has the following structural formula:

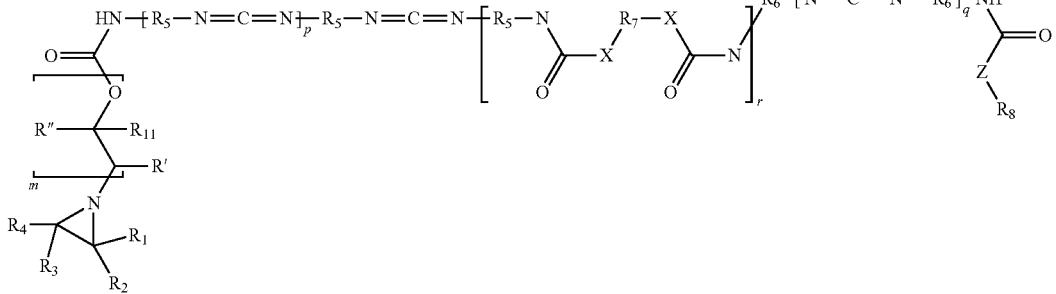

wherein $R_1$, $R_2$, $R_3$, $R_4$, $R_5$, $R_6$, $R_7$, $R_8$, $R_{11}$, R', R", X, Z, p, q, r and m and its preferments are as defined above.

In case the structural unit B present in the aziridine functional carbodiimide compound according to the invention is linked to 2 structural units A, i.e. the aziridine functional carbodiimide compound has the configuration A-B-A, it has the following structural formula:

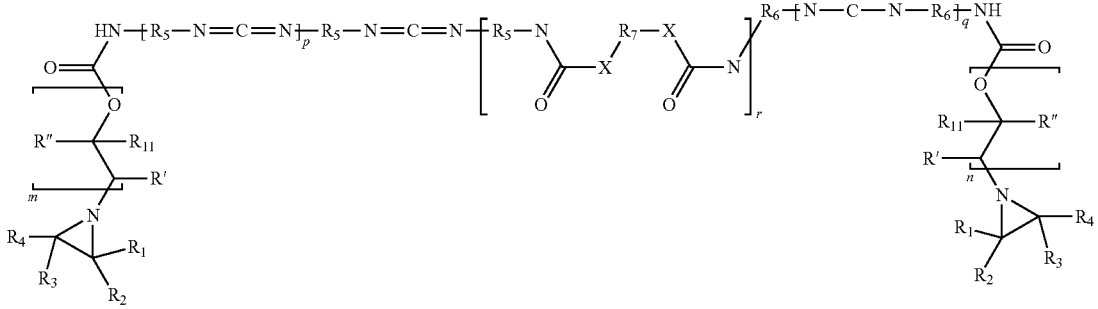

wherein $R_1$, $R_2$, $R_3$, $R_4$, $R_5$, $R_6$, $R_7$, $R_{11}$, R', R", X, p, q, r and m and its preferments are as defined above. m and n are integers from 1 to 6, preferably m and n are independently selected from 1 to 4, more preferably m and n are independently selected from 1 or 2. m and n are preferably equal. Most preferably m and n are both 1.

In one embodiment, the aziridine functional carbodiimide compound has the configuration A-B-A. In another embodiment, the aziridine functional carbodiimide compound has the configuration A-B-C.

Structural Unit B

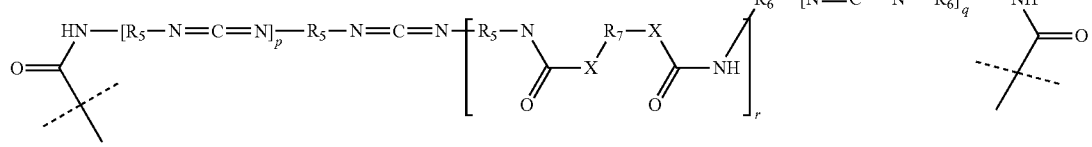

p+q is an integer from 0 to 4, i.e. the aziridine functional carbodiimide compound has at least one carbodiimide functionality and at most 5 carbodiimide functionalities. Preferably, p+q is an integer from 0 to 3, i.e. the aziridine functional carbodiimide compound has at least one carbodiimide functionality and at most 4 carbodiimide functionalities. More preferably p+q is an integer from 0 to 2, i.e. the aziridine functional carbodiimide compound has at least one carbodiimide functionality and at most 3 carbodiimide functionalities. Even more preferably p+q is 0 or 1, i.e. the aziridine functional carbodiimide compound has at least one carbodiimide functionality and at most 2 carbodiimide functionalities. Most preferably p+q is 1, i.e. the aziridine functional carbodiimide compound has 2 carbodiimide functionalities.

r is an integer from 0 to 2. Preferably, r is 0 or 1, more preferably r is 1. in case r is 1, the aziridine functional carbodiimide compound is preferably according to structural formula A-B-A. In case r is 0, the aziridine functional carbodiimide compound is preferably according to structural formula A-B-C.

X is NR, O or NH, preferably X is O. R contains at most 36 carbon atoms and optionally contains one or more heteroatoms in the chain. Preferably R contains one or more heteroatoms in the chain. The heteroatoms preferably being O. Preferably R is a linear or branched group containing from 1 to 36 carbon atoms, preferably from 1 to 12 carbon atoms, more preferably from 1 to 6 carbon atoms or R is cyclic group containing from 3 to 8 carbon atoms.

$R_5$ and $R_6$ are independently containing from 4 to 13 carbon atoms. $R_5$ and $R_6$ are preferably independently selected from an aliphatic hydrocarbon group containing from 4 to 13 carbon atoms, at least one cycloaliphatic hydrocarbon group containing from 5 to 15 carbon atoms, at least one aromatic hydrocarbon group containing from 6 to 13 carbon atoms and any combination thereof. More preferably, $R_5$ and $R_6$ are independently one or two cycloaliphatic hydrocarbon groups containing from 5 to 15 carbon atoms or one aromatic hydrocarbon group containing from 6 to 13 carbon atoms. Preferably, $R_5=R_6$. Typically, $R_5$ and $R_6$ are the hydrocarbon residue from a diisocyanate used to form the carbodiimide functionalities present in structural unit B.

$R_7$ is a divalent group preferably comprising carbon atoms and hydrogen atoms and preferably further comprising one or more heteroatoms. $R_7$ preferably comprises carbon, hydrogen and oxygen atoms. $R_7$ preferably has an average molecular weight of from 62 to 3000 Daltons. The average molecular weight of $R_7$ is determined from the average molecular weight of HX—$R_7$—XH, wherein X is as defined above. In case both X's are O, the average molecular weight of the diol HO—$R_7$—OH is calculated from its OH-value according to the equation: 2*56100/[OH-value in mg KOH/g diol]. The OH value is determined according to ISO 14900 (2017) method A. In case both X's are NH or NR or one X is NH and the other X is NR, the average molecular weight of the diamine HX—$R_7$—XH is calculated from its amine-value according to the equation: 2*56100/ [amine-value in mg KOH/g diamine]. The amine value is determined according to ASTM method D6979-18 (2018).

Preferably $R_7$ contains a hydrophilic segment improving the dispersibility of the aziridine compound in water. Preferably, $R_7$ contains poly(oxyalkylene) units, preferably poly(oxyethylene) units. $R_7$ is preferably a polyether with an average molecular weight of from 106 Daltons to 3000 Daltons, more preferably from 150 Daltons to 2000 Daltons, most preferably from 194 to 1300 Daltons and preferably contains more than 50 wt. % ethoxylated groups, more preferably more than 80 wt. % ethoxylated groups, most preferably more than 90 wt. % ethoxylated groups. The polyether may contain an acid residue or a sodium sulphonate residue. In another preferred embodiment, $R_7$ is the residue of a diol or a diamine or an alcoholamine with formula HX—$R_7$—XH (wherein both X's are O or both X's are NH or both X's are NR or one X is NH and the other X is NR), wherein $R_7$ contains carbon and hydrogen atoms and comprising sulphonate groups like sodium 2-[(2-aminoethyl)amino]ethanesulphonate. A preferred sodium sulphonate is sodium 2-[(2-aminoethyl)amino]ethanesulphonate.

Structural Unit C

The aziridine functional carbodiimide compounds according to the invention optionally contains a structural unit C with the following structural formula:

(C)

wherein

Z is NR, O or NH, wherein R contains at most 36 carbon atoms and optionally contains one or more heteroatoms in the chain. Preferably R contains one or more heteroatoms in the chain. The heteroatoms preferably being O. Preferably R is a linear or branched group containing from 1 to 36 carbon atoms, preferably from 1 to 12 carbon atoms, more preferably from 1 to 6 carbon atoms or R is cyclic group containing from 3 to 8 carbon atoms. Preferably Z is NH or O, more preferably Z is NH.

$R_8$ is a monovalent group preferably comprising carbon atoms and hydrogen atoms. $R_8$ preferably has an average molecular weight of from 62 to 3000 Daltons. The average molecular weight of $R_8$ is determined from the average molecular weight of $HZ—R_8$, wherein Z is as defined above. In case Z is O, the average molecular weight of the monool $HO—R_8$ is calculated from its OH-value according to the equation: 56100/ [OH-value in mg KOH/g monool]. The OH value is determined according to ISO 14900 (2017) method A. In case Z is NH or NR, the average molecular weight of the monoamine $H_2N—R_8$ or $HRN—R_8$ is calculated from its amine-value according to the equation: 56100/ [amine-value in mg KOH/g monoamine]. The amine value is determined according to ASTM method D6979-18 (2018).

Structural unit C is preferably derived from (i.e. $HZ-R_8$ is) a linear or branched monofunctional mono-alcohol or monoamine like for example 1-propanol, 2-propanol, butanol, pentanol, hexanol, heptanol, octanol and its amine analogues. Preferably $R_8$ contains a hydrophilic segment improving the dispersibility of the aziridine compound in water. Preferably, $R_8$ contains poly(oxyalkylene) units, preferably poly(oxyethylene) units. $R_8$ is preferably a polyether with an average molecular weight of from 106 Daltons to 3000 Daltons, more preferably from 200 Daltons to 3000 Daltons, more preferably from 350 Daltons to 2000 Daltons more preferably from 350 Daltons to 2000 Daltons, most preferably from 500 to 1500 Daltons and preferably contains more than 50 wt. % ethoxylated groups, more preferably more than 80 wt. % ethoxylated groups, most preferably more than 90 wt. % ethoxylated groups. Examples are methoxypolyethylene glycol 350, 550, 750 and polyetheramines like the Jeffamine M-600, M-1000, M-2070.

The molecular weight of the aziridine functional carbodiimide compound according to the invention is higher than 600 Daltons and at most 5000 Daltons. The molecular weight of the aziridine functional carbodiimide compound according to the invention is preferably at most 4000 Daltons, more preferably at most 3500 Daltons, more preferably at most 3000 Daltons. The molecular weight of the aziridine functional carbodiimide compound according to the invention is preferably at least 700 Daltons, more preferably at least 750 Daltons, even more preferably at least 800 Daltons and most preferably at least 1000 Daltons. As used herein, the molecular weight of the aziridine functional carbodiimide compound is the calculated molecular weight. The calculated molecular weight is obtained by adding the atomic masses of all atoms present in the structural formula of the aziridine functional carbodiimide compound. If the aziridine functional carbodiimide compound is present in a composition comprising more than one aziridine functional carbodiimide compound according to the invention, for example when one or more of the starting materials to prepare the aziridine functional carbodiimide compound is a mixture, the molecular weight calculation can be performed for each compound individually present in the composition. The molecular weight of the aziridine functional carbodiimide compound according to the invention can be measured using MALDI-TOF mass spectrometry as described in the experimental part below.

In case the desired structural formula of the aziridine functional carbodiimide compound is A-B-A, the aziridine functional carbodiimide compound is prepared without using compound $HZ—R_8$. The starting materials to provide structural units A and B are chosen such that mathematical sum of the molar mass of starting diisocyanate providing carbodiimide functionality in the structural unit B+the molar mass of structural unit A+the molar mass of structural unit A is higher than 600 Daltons, preferably higher than 615 Daltons, more preferably higher than 700 Daltons. Accordingly, the molar mass of the compound with the following structural formula (G) is higher than 600 Daltons, preferably higher than 615 Daltons, more preferably higher than 700 Daltons.

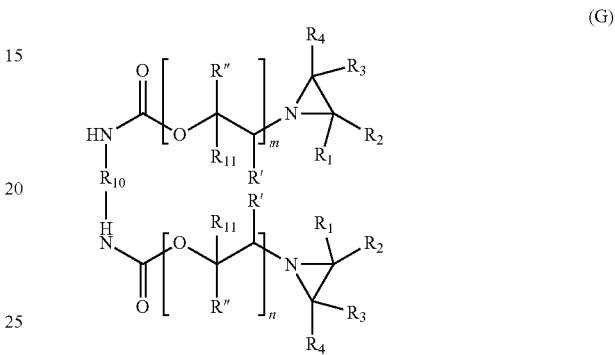

(G)

wherein $R_1$, $R_2$, $R_3$, $R_4$, $R_{11}$, R', R", m and n and its preferments are as defined above. $R_{10}$ is $R_5$ or $R_6$ as defined above. Thus, the mathematical sum of the molar mass of starting diisocyanate providing carbodiimide functionality in the structural unit B+the molar mass of structural unit A+the molar mass of structural unit A is equal to the molar mass of the compound with structural formula (G). The molar mass of the compound with structural formula (G) can be determined with LC-MS as described herein below.

In case the desired structural formula of the aziridine functional carbodiimide compound is A-B-C, the aziridine functional carbodiimide compound is preferably prepared using compound $HZ—R_8$. In this embodiment of the invention, the starting materials to provide structural units A and B are chosen such that mathematical sum of the molar mass of starting diisocyanate providing carbodiimide functionality in the structural unit B+the molar mass of structural unit A+the molar mass of structural unit A is higher than 600 Daltons, preferably higher than 615 Daltons, more preferably higher than 700 Daltons, and in addition, the starting materials to provide structural units A, B and C are chosen such that the mathematical sum of the molar mass of starting diisocyanate providing carbodiimide functionality in the structural unit B+the molar mass of structural unit A+the molar mass of structural unit C is higher than 600 Daltons, preferably higher than 615 Daltons, more preferably higher than 700 Daltons. Accordingly, the molar mass of the compound with the structure formula G as shown above is higher than 600 Daltons, preferably higher than 615 Daltons, more preferably higher than 700 Daltons and in addition the molar mass of the compound with the following structural formula (H) is higher than 600 Daltons, preferably higher than 615 Daltons, more preferably higher than 700 Daltons:

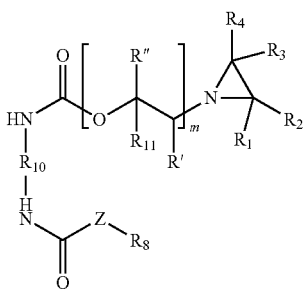

(H)

wherein $R_1$, $R_2$, $R_3$, $R_4$, $R_{11}$, R', R", $R_8$ and $R_{10}$, m and n and its preferments are as defined above. $R_{10}$ is $R_5$ or $R_6$ as defined above. Thus, the mathematical sum of the molar mass of starting diisocyanate providing carbodiimide functionality in the structural unit B+the molar mass of structural unit A+the molar mass of structural unit C is equal to the molar mass of the compound with structural formula (H). The molar mass of the compound with structural formula (H) can be determined with LC-MS as described herein below.

The aziridine functional carbodiimide compound according to the invention preferably has an aziridine equivalent weight (molecular weight of the aziridine functional carbodiimide compound divided by number of aziridinyl groups present in the aziridine functional carbodiimide compound) of at least 300, more preferably at least 350, more preferably at least 400 and even more preferably at least 450 Daltons and preferably at most 5000, more preferably at most 3000, even more preferably at most 2500 Daltons and most preferably at most 2000 Daltons.

An aziridinyl group has the following structural formula:

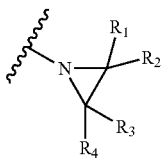

wherein $R_1$, $R_2$, $R_3$ and $R_4$ are as defined above.

The aziridine functional carbodiimide compound according to the invention preferably has an carbodiimide equivalent weight (molecular weight of the aziridine functional carbodiimide divided by number of carbodiimide functionalities present in the compound) of at least 300, preferably at least 350, more preferably at least 400, most preferably at least 600 Daltons and preferably at most 5000, preferably at most 2500, more preferably at most 2000 and most preferably at most 1500 Daltons.

The aziridine functional carbodiimide preferably contains at least 0.5 meq acid reactive groups (i.e aziridine and carbodiimide functionality) per gram solids, preferably at least 1.0 meq/g solids, more preferably 1.5 meq/g solids and at most 5 meq/g solids, preferably at most 4.5 meq/g solids, more preferably at most 4 meq/g solids.

A further aspect of the current invention is a process for preparing the aziridine functional carbodiimide compounds as defined above.

Methods for preparing structural unit A and derivatives are known in the art. For example, synthesis of 1-(2-methylaziridin-1-yl)propan-2-ol is described by S. Lesniak, M. Rachwalski, S. Jarzynski, E. Obijalska *Tetrahedron Asymm.* 2013, 24 1336-1340. Synthesis of 1-(aziridin-1-yl) propan-2-ol is described by A. Baklien, M. V. Leeding, J. Kolm *Aust. J. Chem.* 1968, 21, 1557-1570. Preferred aziridines used for preparing structural unit A are propylene imine and ethylaziridine. Synthesis of ethylaziridine is for example described in EP0227461B1. Most preferred aziridine used for preparing structural unit A is propylene imine The structural unit A present in the compound according to the invention is preferably obtained by reacting at least a monoepoxide compound with an aziridine with the following structural formula (C):

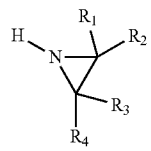

whereby $R_1$, $R_2$, $R_3$ and $R_4$ and its preferments are as defined above. The monoepoxide may be a mixture of monoepoxides. Non-limited examples of monoepoxide are 2-ethyl oxirane, n-butylglycidylether, 2-ethylhexylglycidylether, phenyl glycidyl ether, 4-tert-butylphenyl 2,3-epoxypropyl ether (=t-butyl phenyl glycidyl ether), cresol glycidyl ether (ortho or para) and glycidyl neodecanoate. The monoepoxide is preferably selected from the group consisting of n-butylglycidylether (CAS number 2426-08-6), 2-ethylhexylglycidylether (CAS number 2461-15-6), glycidyl neodecanoate (CAS number 26761-45-5) and any mixture thereof.

The structural unit A present in the compound according to the invention can be obtained in a process comprising at least the following step (i) bringing one equivalent of the epoxide compound into contact with one equivalent of the aziridine with structural formula (C) at a temperature in the range of from 20° C. to 110° C., more suitable from 40° C. to 95° C., even more suitable from 60 to 85° C. at atmospheric pressure. The aziridine with structural formula (C) is preferably propylene imine (CAS number 75-55-8) or 2,2-dimethylaziridine (CAS number 2658-24-4), more preferably the aziridine with structural formula (C) is propylene imine.

Methods for preparing structural unit B and its derivatives are known in the art, see for example EP507407 and WO2012/015295 describe the synthesis of carbodiimide functionality starting from diisocyanates.

The structural unit B present in the compound of the invention is preferably obtained by reacting diisocyanates with the following structural formula (E) to form corresponding polycarbodiimide functionalities:

O=C=N—$R_{10}$—N=C=O (E), wherein $R_{10}$ is $R_5$ or $R_6$ as described above, and optionally diol, diamine and/or hydroxylamine with formula HX—$R_7$—XH (wherein X, R and $R_7$ are as defined above) and optionally HZ—$R_8$ (wherein Z, R and $R_8$ are as defined above). A carbodiimide functionality is obtained by reacting diisocyanates:

2     O=C=N—$R_{10}$—N=C=O→O=C=N—$R_{10}$—N=C=N—$R_{10}$—N=C=O+$CO_2$, with $R_{10}$ is defined as described above. In case the compound of the invention has structural formula A-B-C, the carbodiimide formation is effected in the presence of a component with formula HZ—$R_8$, wherein Z and $R_8$ are as defined above.

These components are usually heated and by use of a catalyst carbodiimides are formed and the reaction is stopped when a desired NCO % by weight has reached in the reaction mixture and subsequently the remaining NCO groups are reacted with structural unit A and optionally structural unit C. The first step of this process (i.e. carbodiimide formation) takes place at a reaction temperature of 70-180° C. while carbon dioxide is evoluted and optionally the hydroxyl or amine functional species HX—$R_7$—XH are incorporated into the backbone. Phospholenes, oxidized phospholene sulphides or phospholene oxides can be used as catalysts for the carbodiimide formation. Typical catalyst are 2,5-dihydro-3-methyl-1-phenylphosphol-1-oxide or 1-methylphospholene-1-oxide. The reaction is continued until a desired NCO % by weight has attained in the reaction mixture. The final NCO % by weight determines the chain length and functionality of the carbodiimide. After decreasing the temperature, the remaining NCO groups are reacted with the hydroxy functional versions of structural unit A and optionally the hydroxy or amine functional version of structural unit C at 20 to 110° C.

The compound according to the invention is preferably obtained by reacting a compound with the following structural formula (D) (providing structural unit A)

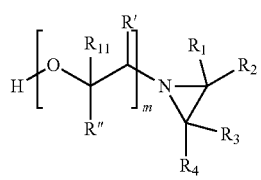

(D)

wherein R', R", m, $R_1$, $R_2$, $R_3$, $R_4$ and $R_{11}$ are as defined above, and diisocyanate with formula E O=C=N—$R_{10}$—N=C=O (E), wherein $R_{10}$ is $R_5$ or $R_6$ as described above, and optionally diol, diamine and/or hydroxylamine with formula F HX—$R_7$—XH (F), wherein X, R and $R_7$ are as defined above (providing structural unit B), and, in case the compound has structural formula A-B-C, compound G HZ—$R_8$ (G), wherein Z,R and $R_8$ are as defined above (providing structural unit C). The compounds with structural formula (D), (E), (F) and (G) are chosen such that the molar mass of the smallest compound that can be formed during the reaction is higher than 600 Daltons, preferably higher than 615 Daltons, more preferably higher than 700 Daltons, i.e. are chosen such that the intrinsically formed byproducts have a molar mass higher than 600 Daltons, preferably higher than 615 Daltons, more preferably higher than 700 Daltons. The present invention further relates to a process for preparing the aziridine compound according to the invention by reacting a compound with structural formula (D) (providing structural unit A) and diisocyanate with formula (E), and optionally diol, diamine and/or hydroxylamine with formula (F), and, in case the compound has structural formula A-B-C, compound G with structural formula (G) (providing structural unit C).

The diisocyanate with formula E O=C=N—$R_{10}$—N=C=O (E), wherein $R_{10}$ is $R_5$ or $R_6$ as described above, preferably has aliphatic reactivity. The term "a polyisocyanate with aliphatic reactivity" being intended to mean compounds in which all of the isocyanate groups are directly bonded to aliphatic or cycloaliphatic hydrocarbon groups, irrespective of whether aromatic hydrocarbon groups are also present. The polyisocyanate with aliphatic reactivity can be a mixture of polyisocyanates with aliphatic reactivity. Compounds based on polyisocyanate with aliphatic reactivity have a reduced tendency of yellowing over time when compared to a similar compound but based on polyisocyanate with aromatic reactivity. The term "a polyisocyanate with aromatic reactivity" being intended to mean compounds in which all of the isocyanate groups are directly bonded to a benzene or naphthalene group, irrespective of whether aliphatic or cycloaliphatic groups are also present. Preferred polyisocyanates with aliphatic reactivity are 1,5-pentamethylene diisocyanate PDI, 1,6-hexamethylene diisocyanate HDI, isophorone diisocyanate IPDI, 4,4'-dicyclohexyl methane diisocyanate H12MDI, 2,2,4-trimethyl hexamethylene diisocyanate, 2,4,4-trimethyl hexamethylene diisocyanate, tetramethylxylene diisocyanate TMXDI (all isomers). More preferred polyisocyanates are isophorone diisocyanate IPDI, 4,4'-dicyclohexyl methane diisocyanate H12MDI and/or tetramethylxylene diisocyanate TMXDI (all isomers). Most preferred polyisocyanate is 4,4'-dicyclohexyl methane diisocyanate H12MDI.

In a preferred embodiment, the aziridine functional carbodiimide compound according to the invention preferably contains polyoxyethylene (—O—CH2—CH2—)$_x$, group(s), polyoxypropylene (—O—CHCH3—CH2—)$_x$, group(s) and/or polytetrahydrofurane (—O—CH2—CH2—CH2—CH2)$_x$, groups, preferably in an amount of at least 5 wt. %, more preferably at least 10 wt. %, more preferably at least 20 wt. % and preferably in an amount of less than 60 wt. %, more preferably less than 45 wt. % and most preferably less than 30 wt. %, relative to the aziridine functional carbodiimide compound. Preferably, the aziridine functional carbodiimide compound contains polyoxyethylene (—O—CH2—CH2—)$_x$, group(s), preferably in an amount of at least 5 wt. %, more preferably at least 10 wt. %, more preferably at least 20 wt. % and preferably in an amount of less than 60 wt. %, more preferably less than 45 wt. % and most preferably less than 30 wt. %, relative to the aziridine functional carbodiimide compound. x represents an average addition mole number of oxyethylene, and x is preferably an integer from 1 to 40, more preferably from 1 to 20 and even more preferably from 3 to 5.

The aziridine functional carbodiimide compound can be stabilized if desired with 0.1 to 1 wt. % of a tertiary amine, preferably a betahydroxy amine like e.g. Amietol M21 or Amietol M-12.

A further aspect of the current invention is a crosslinker composition comprising at least one aziridine functional carbodiimide compound as defined above and further comprising at least one additional component, such as for example remaining starting materials, side-products and/or solvent used for preparing the aziridine functional carbodiimide compound according to the invention. The crosslinker composition may contain only one aziridine functional carbodiimide compound according to the invention but may also contain more than one aziridine functional carbodiimide compound according to the invention. Mixtures of aziridine functional carbodiimide compounds are for example obtained when a mixture of polyisocyanates as starting material to prepare the aziridine functional carbodiimide are used. After having obtained the aziridine functional carbodiimide compound(s) according to the invention, the aziridine functional carbodiimide compound(s) according to the invention may be separated, the reaction product may be used without further purification or solvent used for preparing the aziridine functional carbodiimide may be removed from the composition obtained in the preparation of the aziridine functional carbodiimide compound(s) of the invention. The amount of aziridine functional carbodiimide compounds according to the invention in the crosslinker composition is usually at least 10 wt. %, usually often at least 15 wt. % and most often at least 25 wt. % relative to total amount of the composition. The amount of aziridine functional carbodiimide compounds according to the invention in the crosslinker composition is preferably at least 60 wt. %, more preferably at least 80 wt. % and most preferably at least 99 wt. %, relative to total amount of the crosslinker composition. The molecular weight of the aziridine functional carbodiimide compounds in the crosslinker composition is higher than 600 Daltons and at most 5000 Daltons. Preferred molecular weights are as described above and molecular weights of the aziridine functional carbodiimide compounds are determined using MALDI-TOF-MS as described in the experimental part herein below. MALDI-TOF-MS means matrix-assisted laser desorption ionization time of flight mass spectroscopy. The crosslinker composition preferably comprises at most 1 wt. %, preferably at most 0.5 wt. %, more preferably at most 0.1 wt % and most preferably at most 0.05 wt. % and especially preferred at most 0.01 wt. % of aziridinyl group functional molecules having a molar mass of lower than 600 Daltons, whereby the molar mass is determined with LC-MS as described below.

In view of the potential water sensitivity of the aziridine functional carbodiimide compounds according to the invention, the crosslinker composition is preferably free of substantial amount of water and more preferably is free of water. Free of substantial amount of water means less than 15 wt. %, preferably less than 5 wt. %, more preferably less than 1 wt. % and most preferably less than 0.1 wt. %. In view of the potential water sensitivity of the aziridine functional carbodiimide compounds according to the invention, water is preferably not deliberately (i.e. small amounts of water may be present in the compounds used to prepare the aziridine functional carbodiimide compound(s) according to the invention) be added to the composition. Alternatively, the aziridine functional carbodiimide compound(s) according to the invention is present in the crosslinker composition in dispersed form, i.e. the crosslinker composition is an aqueous dispersion comprising particles of the aziridine functional carbodiimide compound(s) according to the invention. The aqueous dispersion preferably has a pH at least 8.8, more preferably at least 10 and most preferably at least 10.5. Preferably the pH is lower than 12, more preferably lower than 11.5. The particles of the aziridine functional carbodiimide compound(s) preferably have a scatter intensity based average hydrodynamic diameter from 5 to 700 nanometre, more preferably from 10 to 300 nm, even more preferably from 15 to 200 nm, most preferably 15 to 150 nm.

The aziridine functional carbodiimide compounds according to the invention or the crosslinker composition comprising at least one aziridine functional carbodiimide compound as defined above can be advantageously used as crosslinking agent for crosslinking a carboxylic acid functional polymer preferably dissolved and/or dispersed in an aqueous medium. The carboxylic acid functional polymer contains carboxylic acid groups and/or carboxylate groups. As used herein, the amount of carboxylic acid groups present in the carboxylic acid functional polymer is the summed amount of deprotonated and protonated carboxylic acid groups present in the carboxylic acid functional polymer. Thus, the amount of carboxylic acid groups present in the carboxylic acid functional polymer is the summed amount of carboxylate groups and carboxylic acid groups present in the carboxylic acid functional polymer. The polymer to be crosslinked preferably comprises carboxylate groups which are at least partially neutralized with base. Preferably at least part of the base is a volatile base. Preferably, at least a part of the carboxylic acid groups present in the carboxylic acid functional polymer to be crosslinked are subjected to deprotonation to obtain carboxylate groups. The deprotonation is effected by neutralizing the carboxylic acid functional polymer with a base. Examples of suitable bases are ammonia, secondary amines, tertiary amines, LiOH, NaOH and/or KOH.

A further aspect of the present invention is a two-component system comprising a first component and a second component which is separate and distinct from each other, wherein the first component comprising a carboxylic acid functional polymer dissolved and/or dispersed in an aqueous medium and wherein the second composition comprising the aziridine functional carbodiimide compound as defined above or the crosslinker composition comprising at least one aziridine functional carbodiimide compound as defined above, whereby the first and second component are separately stored, since the crosslinking reaction between the crosslinking agent and the polymer to be crosslinked may start immediately after mixing the crosslinking agent with the aqueous composition of polymer to be crosslinked. Non-limited examples of crosslinkable carboxylic acid functional polymers are vinyl polymers like styrene-acrylics, (meth)acrylic copolymers, vinyl acetate (co)polymers such as for example vinyl acetate vinyl chloride ethylene polymers, ethylene acrylic acid polymers, polyurethanes, polycondensates like polyesters, polyamides, polycarbonates and hybrids of any of these polymers where at least one of the two polymers have a carboxylic acid functionality. The present invention further also relates to a coating composition obtained by mixing the first and second component of the two-component system just prior to application of the coating composition, whereby the coating composition comprises aziridinyl groups, carbodiimide groups and carboxylic acid groups in an amount such that the stoichiometric amount (SA) of both aziridinyl groups and carbodiimide groups on carboxylic acid groups is preferably from 0.1 to 2.0, more preferably from 0.2 to 1.1, even more preferably from 0.25 to 0.95, most preferably from 0.3 to 0.8. As used herein, the amount of carboxylic acid groups present in the carboxylic acid functional polymer is the summed amount of deprotonated and protonated carboxylic acid groups present in the carboxylic acid functional polymer to be crosslinked.

The present invention further relates to a substrate having a coating obtained by (i) applying a coating composition as described above to a substrate and (ii) drying the coating composition by evaporation of volatiles. The drying of the coating composition is preferably effected at a temperature lower than 160° C., preferably at a temperature lower than 90° C., more preferably at a temperature lower than 50° C. and most preferably at ambient temperature. The coating composition according to the invention can be applied to any kind of substrate, such as for example wood, leather, concrete, textile, plastic, vinyl floors, glass, metal, ceramics, paper, wood plastic composite, glass fiber reinforced materials. The thickness of the dry coating on the substrate is preferably from 1 to 200 micron, more preferably from 5 to 150 micron and most preferably from 15 to 90 microns. In case the coating composition is an ink, primer or overprint varnish composition applied by printing techniques used in the graphic arts, the thickness of the dry coating is preferably from 0.005 to 35 micron, more preferably from 0.05 to 25 micron and most preferably from 4 to 15 microns.

The invention is further defined by the set of exemplary embodiments as listed hereafter. Any one of the embodiments, aspects and preferred features or ranges as disclosed in this application may be combined in any combination, unless otherwise stated herein or if technically clearly not feasible to a skilled person.

[1] An aziridine compound having:
a) one or two of the following structural units A:

(A)

wherein
$R_1$ is H;
$R_2$ and $R_4$ are independently chosen from H or an aliphatic hydrocarbon group containing from 1 to 4 carbon atoms;
$R_3$ is an aliphatic hydrocarbon group containing from 1 to 4 carbon atoms;
R' and R" are according to (1) or (2):
  (1) R'=H or an aliphatic hydrocarbon group containing from 1 to 14 carbon atoms, and
    R"=H, an aliphatic hydrocarbon group containing from 5 to 14 carbon atoms, a cycloaliphatic hydrocarbon group containing from 5 to 12 carbon atoms, an aromatic hydrocarbon group containing from 6 to 12 carbon atoms, $CH_2$—O—(C=O)—R''', $CH_2$—O—R'''', or $CH_2$—(OCR''''HCR''''H)$_n$—OR''''', whereby R''' is an aliphatic hydrocarbon group containing from 4 to 14 carbon atoms and R'''' is an aliphatic hydrocarbon group containing from 1 to 14 carbon atoms or an aromatic hydrocarbon group containing from 6 to 12 carbon atoms, n being from 1 to 35, R'''' independently being H or an aliphatic hydrocarbon group containing from 1 to 14 carbon atoms and R''''' being an aliphatic hydrocarbon group containing from 1 to 4 carbon atoms,
  (2) R' and R" form together a saturated cycloaliphatic hydrocarbon group containing from 5 to 8 carbon atoms,
$R_{11}$ is H or an aliphatic hydrocarbon group containing from 1 to 14 carbon atoms, preferably $R_{11}$ is H or methyl,
m is an integer from 1 to 6;
b) one structural unit B:

(B)

wherein
p+q is an integer from 0 to 4;
r is an integer from 0 to 2;
X is NH or O or NR, wherein R contains at most 36 carbon atoms and optionally contains one or more heteroatoms in the chain, preferably R contains one or more heteroatoms (preferably O) in the chain, R is preferably a linear or branched group containing from 1 to 36 carbon atoms, preferably from 1 to 12 carbon atoms, more preferably from 1 to 6 carbon atoms or R is cyclic group containing from 3 to 8 carbon atoms;
$R_5$ and $R_6$ are independently containing from 4 to 13 carbon atoms;
$R_7$ is a divalent group; and
c) otionally one structural unit C:

(C)

wherein
Z is NH or O or NR, wherein R contains at most 36 carbon atoms and optionally contains one or more heteroatoms in the chain, preferably R contains one or more heteroatoms (preferably O) in the chain, R is preferably a linear or branched group containing from 1 to 36 carbon atoms, preferably from 1 to 12 carbon atoms, more preferably from 1 to 6 carbon atoms or R is cyclic group containing from 3 to 8 carbon atoms;
$R_8$ is a monovalent group; and
d) structural formula A-B-A or structural formula A-B-C;
e) a molecular weight higher than 600 Daltons and at most 5000 Daltons; with the proviso that
f) the mathematical sum of the molar mass of starting diisocyanate providing carbodiimide functionality in the structural unit B+the molar mass of structural unit A+the molar mass of structural unit A is higher than 600 Daltons; and
g) in case structural unit C is present, the mathematical sum of the molar mass of starting diisocyanate providing carbodiimide functionality in the structural unit B+the molar mass of structural unit A+the molar mass of structural unit C is higher than 600 Daltons.

[2] The aziridine compound according to embodiment [1], wherein $R_1$ is H, $R_2$ is H, $R_3$ is $CH_3$ and $R_4$ is H.

[3] The aziridine compound according to embodiment [1], wherein $R_1$ is H, $R_2$ is H, $R_3$ is CH3 and $R_4$ is $CH_3$.

[4] The aziridine compound according to any of the preceding embodiments, wherein m is 1.

[5] The aziridine compound according to any of the preceding embodiments, wherein R' is H and R"=an alkyl group containing from 5 to 10 carbon atoms, $CH_2$—O—(C=O)—R''', $CH_2$—O—R'''', or $CH_2$—(OCH$_2$CH$_2$)$_n$—OCH$_3$, whereby R''' is an alkyl group containing from 4 to 12 carbon atoms and R'''' is an alkyl group containing from 1 to 12 carbon atoms.

[6] The aziridine compound according to any of the preceding embodiments, wherein p+q is an integer from 0 to 3, more preferably from 0 to 2, even more preferably 0 or 1 and even more preferably 1.

[7] The aziridine compound according to any of the preceding embodiments, wherein r is 0 or 1, more preferably r is 1.

[8] The aziridine compound according to any of the preceding embodiments, wherein $R_5$ and $R_6$ are independently selected from an aliphatic hydrocarbon group containing from 4 to 13 carbon atoms, at least one cycloaliphatic hydrocarbon group containing from 5 to 15 carbon atoms, at least one aromatic hydrocarbon group containing from 6 to 13 carbon atoms and any combination thereof.

[9] The aziridine compound according to any of the preceding embodiments, wherein $R_5$ and $R_6$ are independently one cycloaliphatic hydrocarbon group containing from 5 to 15 carbon atoms, two cycloaliphatic hydrocarbon groups containing from 5 to 15 carbon atoms or one aromatic hydrocarbon group containing from 6 to 13 carbon atoms.

[10] The aziridine compound according to any of the preceding embodiments, wherein $R_5=R_6$.

[11] The aziridine compound according to embodiment 10, wherein $R_5$ and $R_6$ are the hydrocarbon residue from a diisocyanate used to form the carbodiimide functionalities present in structural unit B.

[12] The aziridine compound according to any of the preceding embodiments, wherein $R_7$ is a divalent group with an average molecular weight of from 62 to 3000 Daltons preferably comprising carbon atoms and hydrogen atoms and preferably further comprising one or more heteroatoms, preferably at least oxygen atoms.

[13] The aziridine compound according to any of the preceding embodiments, wherein $R_7$ is a polyether with an average molecular weight of from 106 Daltons to 3000 Daltons, more preferably from 150 Daltons to 2000 Daltons, most preferably from 194 to 1300 Daltons and preferably contains more than 50 wt. % ethoxylated groups, more preferably more than 80 wt. % ethoxylated groups, most preferably more than 90 wt. % ethoxylated groups.

[14] The aziridine compound according to any of the preceding embodiments, wherein X is O and Z is O, preferably X is O and Z is NH.

[15] The aziridine compound according to any of the preceding embodiments, wherein $R_8$ is a monovalent group with an average molecular weight of from 106 to 3000 Daltons preferably comprising carbon atoms and hydrogen atoms and preferably further comprising one or more heteroatoms, preferably at least oxygen atoms.

[16] The aziridine compound according to any of the preceding embodiments, wherein $R_8$ is a polyether with an average molecular weight of from 200 Daltons to 3000 Daltons, more preferably from 350 Daltons to 2000 Daltons, most preferably from 500 to 1500 Daltons and preferably contains more than 50 wt. % ethoxylated groups, more preferably more than 80 wt. % ethoxylated groups, most preferably more than 90 wt. % ethoxylated groups.

[17] An aziridine compound having:
a) one or two of the following structural units A:

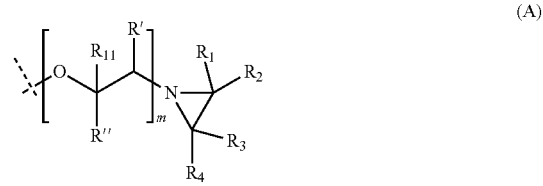

wherein $R_1$ is H;

$R_2$ and $R_4$ are independently chosen from H or an aliphatic hydrocarbon group containing from 1 to 4 carbon atoms;

$R_3$ is an aliphatic hydrocarbon group containing from 1 to 4 carbon atoms;

R' and R" are according to (1) or (2):
  (1) R'=H or an aliphatic hydrocarbon group containing from 1 to 14 carbon atoms, and
    R"=H, an aliphatic hydrocarbon group containing from 5 to 14 carbon atoms, a cycloaliphatic hydrocarbon group containing from 5 to 12 carbon atoms, an aromatic hydrocarbon group containing from 6 to 12 carbon atoms, $CH_2$—O—(C=O)—R''', $CH_2$—O—R'''', or $CH_2$—(OCR'''''HCR''''' H)$_n$—OR''''', whereby R''' is an aliphatic hydrocarbon group containing from 4 to 14 carbon atoms and R'''' is an aliphatic hydrocarbon group containing from 1 to 14 carbon atoms or an aromatic hydrocarbon group containing from 6 to 12 carbon atoms, n being from 1 to 35, R''''' independently being H or an aliphatic hydrocarbon group containing from 1 to 14 carbon atoms and R'''''' being an aliphatic hydrocarbon group containing from 1 to 4 carbon atoms,
  (2) R' and R" form together a saturated cycloaliphatic hydrocarbon group containing from 5 to 8 carbon atoms, $R_{11}$ is H or an aliphatic hydrocarbon group containing from 1 to 14 carbon atoms, preferably $R_{11}$ is H or methyl, m is an integer from 1 to 6;

b) one structural unit B:

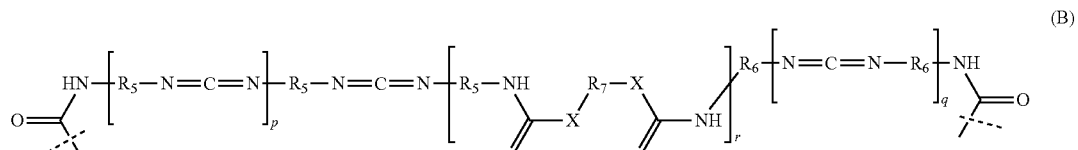

wherein p+q is an integer from 0 to 4;

r is an integer from 0 to 2;

X is NH or O or NR, wherein R contains at most 36 carbon atoms and optionally contains one or more heteroatoms (preferably O) in the chain, preferably R is a linear or branched group containing from 1 to 36 carbon atoms, preferably from 1 to 12 carbon atoms, more preferably from 1 to 6 carbon atoms and preferably containing one or more heteroatoms (preferably O) in the chain, optionally a branched or cyclic group containing from 3 to 8 carbon atoms;

$R_5$ and $R_6$ are independently containing from 4 to 13 carbon atoms;

$R_7$ is a divalent group preferably with an average molecular weight of from 106 to 3000 Daltons; and c) optionally one structural unit C:

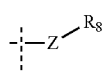

(C)

wherein

Z is NH or O or NR, wherein R contains at most 36 carbon atoms and optionally contains one or more heteroatoms (preferably O) in the chain, preferably R is a linear or branched group containing from 1 to 36 carbon atoms, preferably from 1 to 12 carbon atoms, more preferably from 1 to 6 carbon atoms and preferably containing one or more heteroatoms (preferably O) in the chain, optionally a branched or cyclic group containing from 3 to 8 carbon atoms;

$R_8$ is a monovalent group preferably with an average molecular weight of from 62 to 3000 Daltons; and d) structural formula A-B-A or structural formula A-B-C, with the proviso that the molar mass of the compound with the following structural formula (G) is higher than 600 Daltons, preferably higher than 615 Daltons, more preferably higher than 700 Daltons

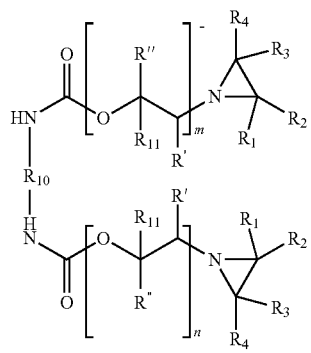

(G)

wherein $R_1$, $R_2$, $R_3$, $R_4$, $R_{11}$, R', R", $R_{10}$, m and n and its preferments are as defined above. $R_{10}$ is $R_5$ or $R_6$ as defined above, and in case structural unit C is present, the molar mass of the compound with the following structural formula (H) is higher than 600 Daltons, preferably higher than 615 Daltons, more preferably higher than 700 Daltons:

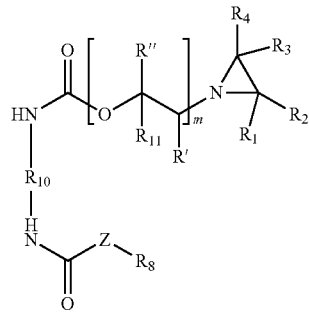

(H)

wherein $R_1$, $R_2$, $R_3$, $R_4$, $R_{11}$, R', R", $R_8$ and $R_{10}$, m and n and its preferments are as defined above.

[18] The aziridine compound according to any of the preceding embodiments, wherein the mathematical sum of the molar mass of starting diisocyanate providing carbodiimide functionality in the structural unit B+the molar mass of structural unit A+the molar mass of structural unit A is higher than 615 Daltons, more preferably higher than 700 Daltons.

[19] The aziridine compound according to any of the preceding embodiments, wherein, in case structural unit C is present (i.e. the aziridine compound is according to structural formula A-B-C), the mathematical sum of the molar mass of starting diisocyanate providing carbodiimide functionality in the structural unit B+the molar mass of structural unit A+the molar mass of structural unit C is higher than 615 Daltons, more preferably higher than 700 Daltons.

[20] The aziridine compound according to any of the preceding embodiments, wherein the aziridine compound has a molecular weight of at most 4000 Daltons, more preferably at most 3500 Daltons, more preferably at most 3000 Daltons, and the molecular weight of the compound is at least 700 Daltons, more preferably at least 750 Daltons, even more preferably at least 800 Daltons and most preferably at least 1000 Daltons.

[21] The aziridine compound according to any of the preceding embodiments, wherein the aziridine compound has an aziridine equivalent weight (molecular weight of the compound divided by number of aziridinyl functionalities present in the compound) of at least 350, more preferably at least 400 and even more preferably at least 450 Daltons and preferably at most 5000, more preferably at most 3000, even more preferably at most 2500 Daltons and most preferably at most 2000 Daltons.

[22] The aziridine compound according to any of the preceding embodiments, wherein the aziridine compound has an carbodiimide equivalent weight (molecular weight of the compound divided by number of carbodiimide functionalities present in the compound) of at least 300, preferably at least 350, more preferably at least 400, most preferably at least 600 Daltons and preferably at most 5000, more preferably at most 2500, more preferably at most 2000 and most preferably at most 1500 Daltons.

[23] The aziridine compound according to any of the preceding embodiments, wherein the aziridine compound contains at least 0.5 meq acid reactive groups (i.e aziridine and carbodiimide functionality) per gram solids, preferably at least 1.0 meq/g, more preferably 1.5 meq/g and at most 5 meq/g, preferably at most 4.5 meq/g, more preferably at most 4 meq/g.

[24] The aziridine compound according to any of the preceding embodiments, wherein the structural unit A is obtained by reacting at least a monoepoxide compound with an aziridine with the following structural formula:

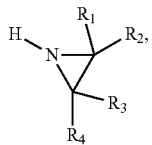

whereby $R_1$, $R_2$, $R_3$ and $R_4$ are defined as in any of embodiments 1 to 3.

[25] The aziridine compound according to embodiment [24], wherein the monoepoxide compound is selected from the group consisting of n-butylglycidylether, 2-ethylhexylglycidylether, phenyl glycidyl ether, 4-tert-butylphenyl 2,3-epoxypropyl ether (=t-butyl phenyl glycidyl ether), cresol glycidyl ether (ortho or para), glycidyl neodecanoate and any mixture thereof.

[26] The aziridine compound according to embodiment [24], wherein the monoepoxide compound is selected from the group consisting of n-butylglycidylether (CAS number 2426-08-6), 2-ethylhexylglycidylether (CAS number 2461-15-6), glycidyl neodecanoate (CAS number 26761-45-5) and any mixture thereof.

[27] The aziridine compound according to any of embodiments [24] to [26], wherein the aziridine is propylene imine (CAS number 75-55-8) or 2,2-dimethylaziridine (CAS number 2658-24-4), more preferably the aziridine is propylene imine.

[28] The aziridine compound according to any of the preceding embodiments, wherein the structural unit B is obtained by reacting diisocyanate with formula O=C=N—$R_{10}$—N=C=O, wherein $R_{10}$ is $R_5$ or $R_6$ as defined in any of the preceding embodiments, and optionally diol, diamine and/or hydroxylamine with formula HX—$R_7$—XH, wherein X and $R_7$ are as defined in any of the preceding embodiments and optionally HZ-$R_8$, wherein Z and $R_8$ are as defined in any of the preceding embodiments.

[29] The aziridine compound according to any of the preceding embodiments, wherein the aziridine compound is obtained by reacting a compound with the following structural formula (D) (providing structural unit A)

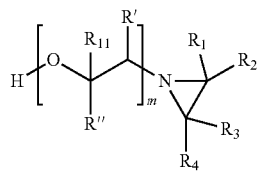

wherein R', R", $R_{11}$, m, $R_1$, $R_2$, $R_3$ and $R_4$ are as defined above, and diisocyanate with formula E O=C=N—$R_{10}$—N=C=O (E), wherein $R_{10}$ is $R_5$ or $R_6$ as defined in any of the embodiments above, and optionally diol, diamine and/or hydroxylamine with formula F HX—$R_7$—XH (F), wherein X, R and $R_7$ are as defined in any of the embodiments (providing structural unit B), and, in case the compound has structural formula A-B-C, compound G HZ—$R_8$ (G), wherein Z, R and $R_8$ are as defined in any of the embodiments (providing structural unit C).

[30] The aziridine compound according to embodiment [29], wherein the diisocyanate with formula E O=C=N—$R_{10}$—N=C=O (E) has aliphatic reactivity.

[31] The aziridine compound according to embodiment [29] or [30], wherein the diisocyanate with aliphatic reactivity is 1,5-pentamethylene diisocyanate PDI, 1,6-hexamethylene diisocyanate HDI, isophorone diisocyanate IPDI, 4,4'-dicyclohexyl methane diisocyanate H12MDI, 2,2,4-trimethyl hexamethylene diisocyanate, 2,4,4-trimethyl hexamethylene diisocyanate and/or tetramethylxylene diisocyanate TMXDI (all isomers).

[32] The aziridine compound according to any of the preceding embodiments, wherein in case r is 1, the aziridine functional carbodiimide compound has structural formula A-B-A.

[33] The aziridine compound according to any of the embodiments [1] to [31], wherein in case r is 0, the aziridine functional carbodiimide compound has structural formula A-B-C.

[34] The aziridine compound according to any of the embodiments [1] to [33], wherein the molar mass of the compound with the following structural formula (G) is higher than 600 Daltons, preferably higher than 615 Daltons, more preferably higher than 700 Daltons

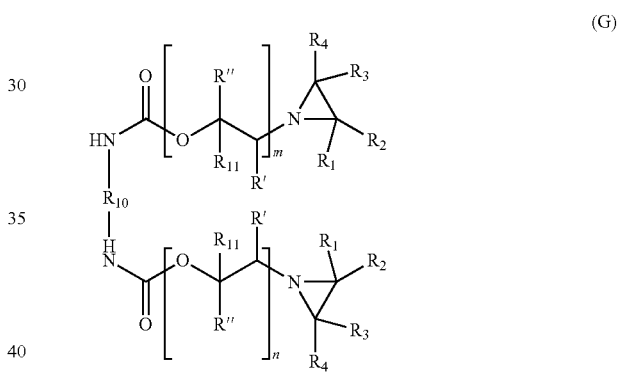

wherein $R_1$, $R_2$, $R_3$, $R_4$, $R_{11}$, R', R", $R_{10}$, m and n and its preferments are as defined above. $R_{10}$ is $R_5$ or $R_6$ as defined above.

[35] The aziridine compound according to any of the embodiments [1] to [34], wherein, in case structural unit C is present, the molar mass of the compound with the following structural formula (H) is higher than 600 Daltons, preferably higher than 615 Daltons, more preferably higher than 700 Daltons:

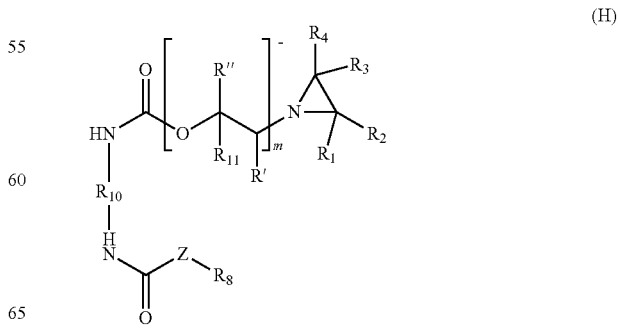

wherein $R_1$, $R_2$, $R_3$, Ra, $R_{11}$, R', R", $R_8$ and $R_{10}$, m and n and its preferments are as defined above

[36] A crosslinker composition comprising at least one aziridine compound according to any of the preceding embodiments and further comprising at least one additional component.

[37] The crosslinker composition according to embodiment [36], wherein the crosslinker composition comprises at most 1 wt. %, preferably at most 0.5 wt. %, more preferably at most 0.1 wt % and most preferably at most 0.05 wt. % and especially preferred at most 0.01 wt. % of aziridinyl group functional molecules having a molar mass of lower than 600 Daltons.

[38] The crosslinker composition according to any of embodiments [36] to [37], wherein the composition is an aqueous dispersion comprising particles of the aziridine compound according to any of embodiments 1 to [35].

[39] The crosslinker composition according to any of embodiments [36] to [38], wherein the particles present in the dispersion have a scatter intensity based average hydrodynamic diameter from 5 to 700 nanometre, more preferably from 10 to 300 nm, even more preferably from 15 to 200 nm, most preferably 15 to 150 nm.

[40] The crosslinker composition according to embodiment [39], wherein the aqueous dispersion has a pH of at least 8.8, more preferably at least 10 and most preferably at least 10.5.

[41] The crosslinker composition according to embodiment [39] or [40], wherein the aqueous dispersion has a pH lower than 12, preferably lower than 11.5.

[42] Use of the aziridine compound according to any of embodiments [1] to [35] or the crosslinker composition according to any of embodiments [36] to [41] for crosslinking a carboxylic acid functional polymer dissolved and/or dispersed in an aqueous medium.

[43] A two-component system comprising a first component and a second component each of which is separate and distinct from each other and wherein the first component comprises a carboxylic acid functional polymer dissolved and/or dispersed in an aqueous medium and the second component comprises a aziridine compound according to any of embodiments [1] to [35] or the crosslinker composition according to any of embodiments [36] to [40].

[44] A substrate having a coating obtained by (i) applying a coating composition obtained by mixing the first and second component of the two-component system according to embodiment [42] to a substrate and (ii) drying the coating composition by evaporation of volatiles.

The invention is further defined by the set of exemplary embodiments as listed hereafter. Any one of the embodiments, aspects and preferred features or ranges as disclosed in this application may be combined in any combination, unless otherwise stated herein or if technically clearly not feasible to a skilled person.

The present invention is now illustrated by reference to the following examples. Unless otherwise specified, all parts, percentages and ratios are on a weight basis.

Components and Abbreviations Used:

n-butylglycidyl ether (CAS No. 2426-08-6) was obtained from Alfa Aesar (a division of Thermo Fisher Scientific).

Di(propylene glycol) dimethyl ether (Proglyde DMM, CAS No. 111109-77-4) was obtained from Dow Inc Polyethylene Glycol Monomethyl Ether (CAS No. 9004-74-4), with a number average molecular weight of 500 Da was obtained from Acros Organics (a division of Thermo Fisher Scientific), and with a number average molecular weight of 750 Da was obtained from Acros Organics (a division of Thermo Fisher Scientific)

Potassium carbonate (CAS No. 584-08-7) was obtained from Alfa Aesar (a division of Thermo Fisher Scientific).

Cardura E10P (CAS No. 26761-45-5) was obtained from Hexion Inc. H12MDI (4,4'-Methylenebis(phenyl isocyanate, Desmodur® W, CAS No. 101-66-8) from Covestro.

Trimethylolpropane tris(2-methyl-1-aziridinepropionate), CAS No. 64265-57-2, CX-100 was obtained from DSM.

2-Methylaziridine (propyleneimine, PI, CAS No. 75-55-8) was obtained from Menadiona S.L. (Palafolls, Spain).

1,3-bis(2-isocyanatopropan-2-yl)benzene (m-tetramethylxylene diisocyanate, TMXDI, CAS No. 2778-42-9) was obtained Allnex IPDI (5-lsocyanato-1-(isocyanatomethyl)-1,3,3-trimethylcyclohexane, Desmodur® I, isophorone diisocyanate, CAS No. 4098-71-9) was obtained from Covestro.

Bismuth neodecanoate (CAS No. 34364-26-6) obtained from TIB chemicals AG (Mannheim, Germany).

1-methoxy-2-propanol acetate (propylene glycol methyl ether acetate, CAS No. 108-65-6) was obtained from Shell Chemicals.

Hydrazine (16% solution in water, CAS No. 302-01-2) was obtained from Honeywell. Dimethylol propionic acid (DMPA, CAS No. 4767-03-7) was obtained from Perstop Polyols.

Triethylamine (TEA, CAS No. 121-44-8) was obtained from Arkema Sodium lauryl sulphate (30% solution in water, CAS No. 73296-89-6) was obtained from BASF.

Methyl methacrylate (CAS No. 80-62-6) was obtained from Lucite Int.

n-Butyl acrylate (CAS No. 141-32-2) was obtained from Dow Chemical.

Methacrylic acid (CAS No. 79-41-4) was obtained from Lucite Int.

Ammonium persulphate (CAS No. 7727-54-0) was obtained from United Initiators.

Ammonia (25% solution in water, CAS No. 1336-21-6) was obtained from Merck.

Dipropylene glycol dimethyl ether (CAS No. 34590-94-8) was obtained from Dow Chemical.

1-propanol (CAS No. 71-23-8) was obtained from Sigma-Aldrich.

Tin 2-ethylhexanoate (CAS No. 301-10-0) was obtained from Sigma-Aldrich.

Dibutyltindilaurate (CAS No. 77-58-7) was obtained from Sigma-Aldrich (a division of Merck KGaA).

Tegomer® D3403 was obtained from Evonik.

1-(2-hydroxyethyl)ethyleneimine (CAS No. 1072-52-2) was obtained from TCI Europe Polypropyleneglycol with a number average molecular weight of 1000 Da and with a number average molecular weight of 2000 Da was obtained from BASF.

3-Methyl-1-phenyl-2-phospholene-1-oxide (CAS No. 707-61-9) was obtained from Sigma-Aldrich.

LC-MS

LC-MS analysis for the determination of the concentration and the exact mass of low molecular weight fraction was performed using the following procedure:

LC system: Agilent 1290 Infinity II; Detector #1: Agilent 1290 Infinity II PDA; Detector #2: Agilent iFunnel 6550 Q-TOF-MS A solution of ~2000 mg/kg of material was prepared gravimetrically in ethanol and stirred. 1 µl of this solution was injected into a UPLC equipped with ESI-TOF-MS detection. The column used was a 100×2.1 mm, 1.8 um, Waters HSS T3 C18 operated at 40° C. Flow rate was 0.5 ml.min-1. Solvents used were 10 mM NH$_4$CH$_3$COO in water (set to pH 9.0 with NH$_3$. Eluent A), Acetonitrile (B) and THF (C). 2 binary gradients were applied from 95/5 A/B to 0/100 A/B in 20 minutes and from 100/0 BC to 50/50 B/C in 1 minute, and from 50/50 BC to 100/0 BC in 1 minute, after which starting conditions are applied (95/5 A/B). Assuming linear MS response of all components over all response ranges and an equal ionization efficiency for all components, Total Ion Current signals were integrated. In case of coelution extracted ion chromatograms of that particular species were integrated. Calibration was performed using a diluted EtOH-IPDI-EtOH standard.

MALDI-ToF-MS

All MALDI-ToF-MS spectra were acquired using a Bruker Ultraflextreme MALDI-ToF mass spectrometer. The instrument is equipped with a Nd:YAG laser emitting at 1064 nm and a collision cell (not used for these samples). Spectra were acquired in the positive-ion mode using the reflectron, using the highest resolution mode providing accurate masses (range 60-7000 m/z). Cesium Tri-iodide (range 0.3-3.5 kDa) was used for mass calibration (calibration method: IAV Molecular Characterisation, code MC-MS-05). The laser energy was 20%. The samples were dissolved in THF at approx. 50 mg/mL. The matrix used was: DCTB (trans-2-[3-(4-tert-Butylphenyl)-2-methyl-2-propenylidene]malononitrile), CAS Number 300364-84-5. The matrix solution was prepared by dissolving 20 mg in 1 mL of THF.

The peaks measured in the MALDI spectrum are sodium adducts of aziridine compounds, and in the context of this specification the molecular weight (MVV) of the aziridine functional carbodiimide compound corresponds to MW=Obs. [M+M$_{cation}$]−M$_{cation}$, where Obs. [M+M$_{cation}$] is the MALDI-TOF MS peak and M$_{cation}$ is the exact mass of the cation used for making the adduct (in this case sodium with is M$_{cation}$=23.0 Da). Aziridine functional carbodiimide compounds can be identified by comparing the MW with the exact molecular mass (i.e. the sum of the—non-isotopically averaged—atomic masses of its constituent atoms) of a theoretical structure, using a maximum deviation of 0.6 Da.

Genotoxicity Testing

Genotoxicity of examples and comparatives was evaluated by the ToxTracker® assay (Toxys, Leiden, the Netherlands). The ToxTracker assay is a panel of several validated Green Fluorescent Protein (GFP)-based mouse embryonic stem (mES) reporter cell lines that can be used to identify the biological reactivity and potential carcinogenic properties of newly developed compounds in a single test. This methodology uses a two step-approach.

In the first step a dose range finding was performed using wild-type mES cells (strain B4418). 20 different concentrations for each compound was tested, starting at 10 mM in DMSO as highest concentration and nineteen consecutive 2-fold dilutions.

Next, genotoxicity of examples and comparatives was evaluated using specific genes linked to reporter genes for the detection of DNA damage; i.e. Bscl2 (as elucidated by US9695481B2 and EP2616484B1) and Rtkn (Hendriks et. al. Toxicol. Sci. 2015, 150, 190-203) biomarkers. Genotoxicity was evaluated at 10, 25 and 50% cytotoxicity in absence and presence of rat S9 liver extract-based metabolizing systems (aroclor1254-induced rats, Moltox, Boone, NC, USA). The independent cell lines were seeded in 96-well cell culture plates, 24 h after seeding the cells in the 96-well plates, fresh ES cell medium containing the diluted test substance was added to the cells. For each tested compound, five concentrations are tested in 2-fold dilutions. The highest sample concentration will induce significant cytotoxicity (50-70%). In case of no or low cytotoxicity, 10 mM or the maximum soluble mixture concentration is used as maximum test concentration. Cytotoxicity is determined by cell count after 24 h exposure using a Guava easyCyte 10HT flow cytometer (Millipore).

GFP reporter induction is always compared to a vehicle control treatment. DMSO concentration is similar in all wells for a particular compound and never exceeds 1%. All compounds were tested in at least three completely independent repeat experiments. Positive reference treatment with cisplatin (DNA damage) were included in all experiments. Metabolic was evaluated by addition of S9 liver extract. Cells are exposed to five concentrations of the test compound in the presence of S9 and required co-factors (RegenSysA+B, Moltox, Boone, NC, USA) for 3 h. After washing, cells are incubated for 24 h in fresh ES cell medium. Induction of the GFP reporters is determined after 24 h exposure using a Guava easyCyte 10HT flow cytometer (Millipore). Only GFP expression in intact single cells is determined. Mean GFP fluorescence and cell concentrations in each well is measured, which is used for cytotoxicity assessment. Data was analyzed using ToxPlot software (Toxys, Leiden, the Netherlands). The induction levels reported are at compound concentrations that induce 10%, 25% and 50% cytotoxicity after 3 h exposure in the presence of S9 rat liver extract and 24 h recovery or alternatively after 24 h exposure when not in the presence of S9 rat liver extract.

A positive induction level of the biomarkers is defined as equal to or higher than a 2-fold induction at at least one of 10, 25 and 50% cytotoxicity in the absence or presence of the metabolizing system rat S9 liver extract; a weakly positive induction as higher than 1.5-fold and lower than 2-fold induction at at least one of 10, 25 and 50% cytotoxicity (but lower than 2-fold at 10, 25 and 50% cytotoxicity) in the absence or presence of the metabolizing system rat S9 liver extract and a negative as lower than or equal to a 1.5-fold induction at 10, 25 and 50% cytotoxicity in the absence and presence of rat S9 liver extract-based metabolizing systems.

Solids Content

The solids content on was determined on a Mettler Toledo HB43-S Compact Halogen Moisture Analyzer. At the start of the measurement the Moisture Analyzer determines the weight of the sample, the sample is then heated to 130° C. by the integral halogen heating module and the volatile compounds vaporizes. During the drying process the instrument continually measures the weight of the sample. Once drying has been completed, the solids content of the sample is displayed as the final result.

Particle Size Measurement

The scatter intensity based average hydrodynamic diameter of the particles was determined using a method derived from the ISO 22412:2017 standard with a Malvern Zetasizer Nano S90 DLS instrument that was operated under the following settings: as material, a polystyrene latex was defined with a RI of 1,590 and an absorption of 0.10 with a continuous medium of demineralized water with a viscosity of 0.8812 cP and a RI of 1,332 at 25° C. Measurements were performed in DTS0012 disposable cuvettes, obtained from Malvern Instruments (Malvern, Worcestershire, United Kingdom). Measurements were performed under a 173° backscatter angle as an average of 3 measurements after 120 seconds equilibration, consisting of 10-15 subruns — optimized by the machine itself. The focus point of the laser was at a fixed position of 4,65 cm and data was analyzed using a general-purpose data fitting process. Samples were prepared by diluting 0,05g (1 drop) sample dispersion in approximately 5 mL of demineralized water. If the sample still looked hazy it was further diluted with distilled water until it becomes almost clear. This method is suitable for determining particle sizes from 2 nm to 3 μm.

Chemical Resistance

Chemical resistance testing based on DIN 68861-1:2011-01 standard.

Synthesis of Cardura E-10/PI Adduct:

A 1 L round bottom flask equipped with a condenser was placed under a $N_2$ atmosphere and charged with propylene imine (69.0 gram), Cardura E1OP (201.0 gram) and $K_2CO_3$ (7.30 gram) and heated to 80° C., after which the mixture was stirred for 24 h at T=80° C. After filtration the excess of PI was removed in vacuo, resulting in a colorless low viscous liquid.

Synthesis of BGE/PI Adduct:

A 1 L round bottom flask equipped with a condenser was placed under a $N_2$ atmosphere and charged with propylene imine (80.0 gram), n-butyl glycidyl ether (126.0 gram) and $K_2CO_3$ (10.00 gram) and heated to 80° C. in 30 min, after which the mixture was stirred for 21 h at T=80° C. After filtration the excess of PI was removed in vacuo, followed by further purification via vacuum distillation, resulting in a colorless low viscous liquid.

COMPARATIVE EXAMPLE 1

Comparative Example 1 is CX-100, trimethylolpropane tris(2-methyl-1-aziridinepropionate). Chemical structure is shown below.

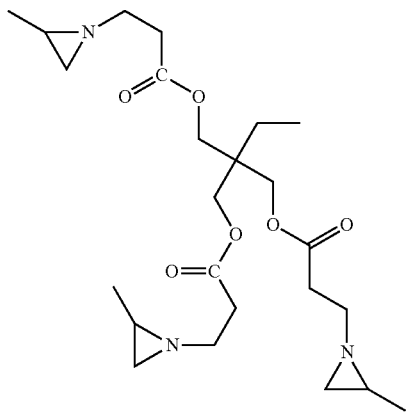

Genotoxicity Test Results:

|  | Without S9 rat liver extract | | | | | | With S9 rat liver extract | | | | | |
|---|---|---|---|---|---|---|---|---|---|---|---|---|
|  | Bscl 2 | | | Rtkn | | | Bscl 2 | | | Rtkn | | |
|  | \multicolumn{6}{c\|}{concentration} | | | | | | | |
|  | 10 | 25 | 50 | 10 | 25 | 50 | 10 | 25 | 50 | 10 | 25 | 50 |
| Comp. Ex. 1 | 1.2 | 1.5 | 2.0 | 1.4 | 2.0 | 3.2 | 1.7 | 2.3 | 2.1 | 3.0 | 4.3 | 3.4 |

The genotoxicity test results show that the crosslinker of Comp. Ex. 1 is genotoxic.

COMPARATIVE EXAMPLE 2

Example 5 EP0507407B1

Under a nitrogen atmosphere, 21.3 g (0.354 mole) of 1-propanol was added over a period of 6 hours to 78.7 g Isophorone diisocyanate (IPDI) and 0.01 g tin 2-ethyl hexanoate at 20-25° C., while stirring. After standing overnight, 196.3 g (0.883 mole) IPDI, 74.1 g (0.0628 mole) Tegomer D3403 and 2.4 g 3-Methyl-1-phenyl-2-phospholene-1-oxide were added. The mixture was heated while stirring to 150° C. The mixture was kept at 150° C. until NCO content was 7.0 wt %. Mixture was cooled to 80° C. and 333g methoxypropyl acetate was added. A solution of isocyanate functional polycarbodiimide was obtained with a solid content of 50.6 wt % and an NCO content of 7.0 wt % on solids.

To 100g of this isocyanate functional polycarbodiimide was added 7.0 g 1-(2-hydroxyethyl)ethyleneimine (0.08 mole). One drop of dibutyltin dilaurate was added. The mixture was heated to 80° C. while stirring. The mixture was kept at 80° C. for 1 hour. FTIR showed a small remaining isocyanate signal, which disappeared after a few days. The solution was further diluted with 8.0 g methoxypropyl acetate, resulting in a yellow solution with a solid content of 50.4 wt %. This aziridine functional carbodiimide contains 3.2 meq acid reactive groups (i.e aziridine and carbodiimide functionality) per gram solids.

Smallest intrinsically formed aziridine functional byproduct compound is the reaction product of 1-(2-hydroxyethyl)ethyleneimine/IPDI/1-propanol and has a calculated molar mass of 369.26 and this structure is illustrated below:

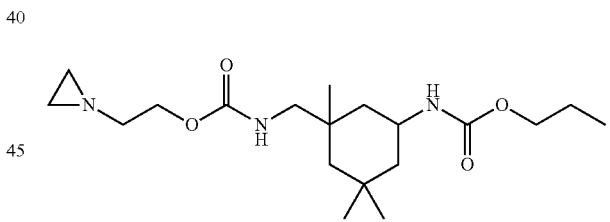

Another intrinsically formed aziridine functional byproduct compound is the reaction product of 1-(2-hydroxyethyl)ethyleneimine/IPDI/1-(2-hydroxyethyl)ethyleneimine having a calculated molar mass of 396.27 and this structure is illustrated below:

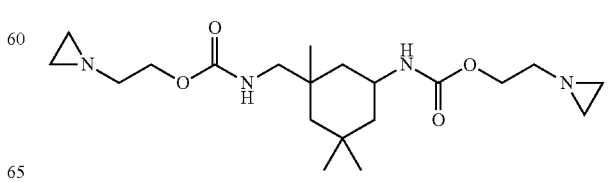

The chemical representation of the aziridine functional carbodiimide can be illustrated as:

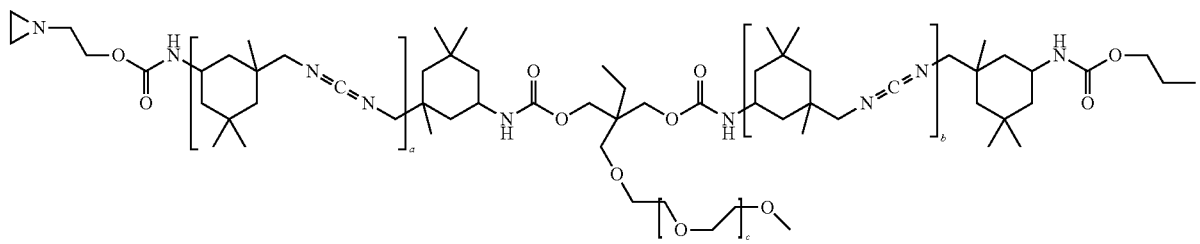

in which a, b and c indicates repeating units.

This generalized structure was confirmed by MALDI-TOF-MS, an example is shown below:

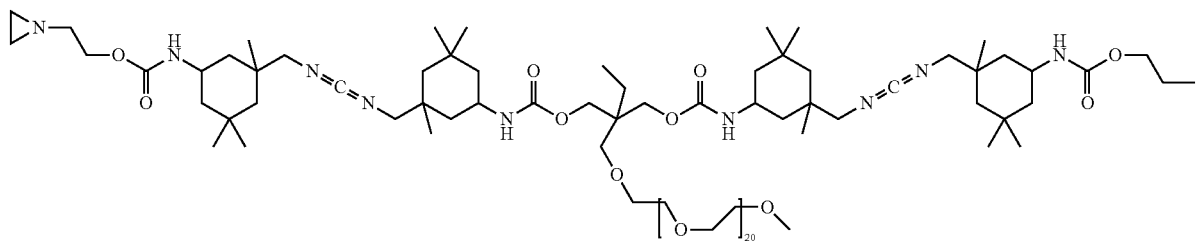

Molecular weight was confirmed by Maldi-TOF-MS: Calcd. [M+Na+]=2043.34 Da; Obs. [M+Na+]=2043.32 Da.

Genotoxicity Test Results:

| | Without S9 rat liver extract | | | | | | With S9 rat liver extract | | | | | |
|---|---|---|---|---|---|---|---|---|---|---|---|---|
| | Bscl 2 | | | Rtkn | | | Bscl 2 | | | Rtkn | | |
| | | | | concentration | | | | | | | | |
| | 10 | 25 | 50 | 10 | 25 | 50 | 10 | 25 | 50 | 10 | 25 | 50 |
| Comp. Ex. 2 | 1.3 | 1.5 | 1.6 | 1.2 | 1.9 | 1.9 | 1.2 | 1.4 | 1.5 | 2.0 | 2.0 | 1.8 |

The genotoxicity test results demonstrate that the crosslinker of comparative example 2 is genotoxic.

EXAMPLE 1

Under a nitrogen atmosphere a mixture of 46.7 g (0.210 mole) of Isophorone diisocyanate (IPDI), 25.3 g (0.0214 mole) Tegomer D3403 and 0.02 g Bismuth Neodecanoate was heated to 65° C. while stirring. After 1 hour of reacting at 65° C., 0.47 g 3-methyl-1-phenyl-2-phospholene-1-oxide was added to the mixture. The mixture was heated while stirring to 150° C. The mixture was kept at 150° C. until NCO content was 8.6 wt %. Mixture was cooled to 80° C. and 60.4g methoxypropyl acetate was added and stirred to homogeneous. 30 g Cardura E-10/propylene imine adduct (0.105 mole) and 1 drop of dibutyltin dilaurate were added to the reaction mixture. The mixture was kept while stirring at 65° C. for 5 hours. FTIR showed a no isocyanate signal. 30 g methoxypropyl acetate was added. A yellow solution with a solid content of 50.0 wt % was obtained. The reaction product is a mixture which contains a range of compounds having a structure according to claim 1.

This aziridine functional carbodiimide contains 1.2 meq per gram solids aziridine groups and 1.2 meq per gram solids carbodiimide groups resulting in a total of 2.4 meq acid reactive groups (i.e aziridine and carbodiimide functionality) per gram solids. The aziridine functional compound with the smallest (calculated) molar mass is the reaction product of propylene imine-CarduraE10/IPDI/CarduraE10-propylene imine having a molar mass 792.6.

The structure of the smallest intrinsically formed aziridine functional byproduct compound is illustrated as:

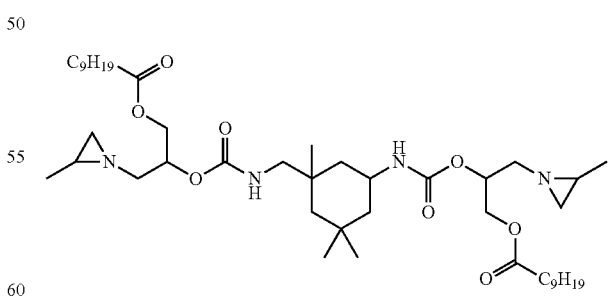

The calculated molecular weights of the theoretical main components was confirmed with Maldi-TOF-MS and are shown below with their structures:

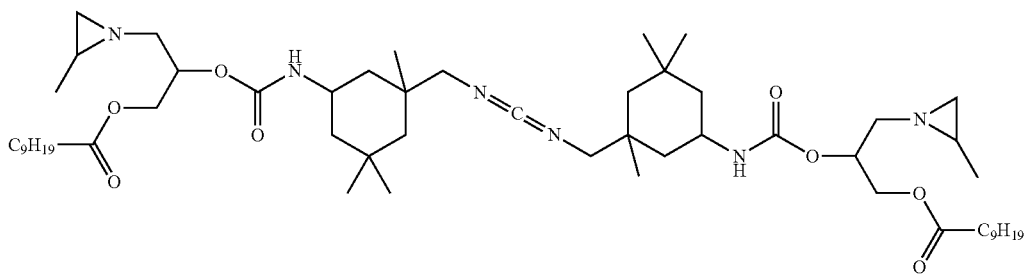

Calcd. [M+Na+]=993.73 Da; Obs. [M+Na+]=993.68 Da.

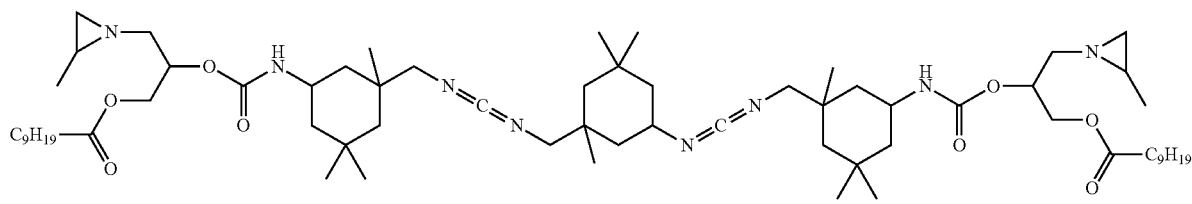

Calcd. [M+Na+]=1171.88 Da; Obs. [M+Na+]=1171.89 Da.

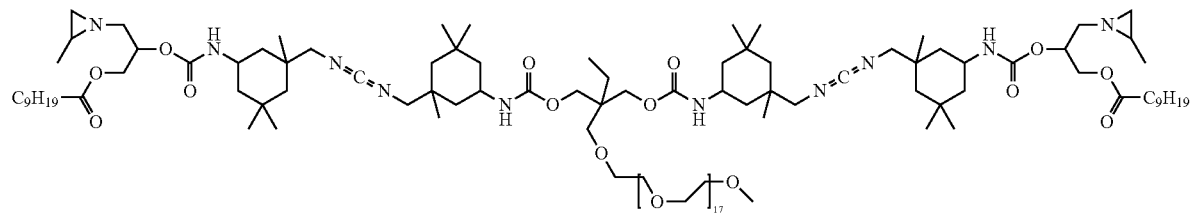

Calcd. [M+Na+]=2334.60 Da; Obs. [M+Na+]=2334.60 Da.

The following component with a mass below 600 Da was determined by LC-MS and quantified:

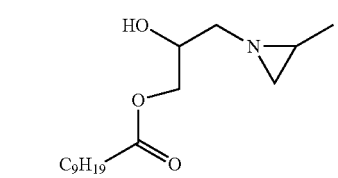

was present in the composition at 0.81 wt %.

Genotoxicity Test Results:

| | Without S9 rat liver extract | | | | | | With S9 rat liver extract | | | | | |
|---|---|---|---|---|---|---|---|---|---|---|---|---|
| | Bscl 2 | | | Rtkn | | | Bscl 2 | | | Rtkn | | |
| | | | | concentration | | | | | | | | |
| | 10 | 25 | 50 | 10 | 25 | 50 | 10 | 25 | 50 | 10 | 25 | 50 |
| Example 1 | 1.1 | 1.2 | 1.3 | 1.2 | 1.3 | 1.2 | 1.1 | 1.2 | 1.3 | 1.2 | 1.4 | 1.2 |

All values in this table show a negative induction level of the biomarkers of lower than a 1.5-fold induction at 10, 25 and 50% cytotoxicity in the absence and presence of rat S9 liver extract-based metabolizing systems and demonstrate that the crosslinker of example 1 is non-genotoxic.

EXAMPLE 2

Under a nitrogen atmosphere a mixture of 25.0 g (0.102 mole) of m-Tetramethylxylylene diisocyanate (TMXDI), 25.0 g (0.095 mole) Dicyclohexylmethane-4,4'-diisocyanate (H12MDI), 21.42 g (0.0182 mole) Tegomer D3403 and 0.02 g Bismuth Neodecanoate was heated to 65° C. while stirring. After 1 hour of reacting at 65° C., 0.50 g 3-methyl-1-phenyl-2-phospholene-1-oxide was added to the mixture. The mixture was heated while stirring to 150° C. The mixture was kept at 150° C. until NCO content was 7.2 wt %. Mixture was cooled to 80° C. and 65.8 g methoxypropyl acetate was added and stirred to homogeneous. 19.2 g Butylglycidylether/propylene imine adduct (0.103 mole) and 1 drop of dibutyltin dilaurate were added to the reaction mixture. The mixture was kept while stirring at 65° C. for 5 hours. FTIR showed a no isocyanate signal. 19.1 g methoxypropyl acetate was added. A yellow solution with a solid content of 50.0 wt % was obtained. The reaction product is a mixture which contains a range of compounds having a structure according to claim 1.

This aziridine functional carbodiimide contains 1.2 meq per gram solids aziridine groups and 1.4 meq per gram solids carbodiimide groups resulting in a total of 2.6 meq acid reactive groups (i.e aziridine and carbodiimide functionality) per gram solids. The aziridine functional compound with the smallest (calculated) molar mass is the reaction product of butylglycidylether-propylene imine/TMXDI/butylglycidylether-propylene imine having a molar mass of 618.44.

The structure of the smallest intrinsically formed aziridine functional byproduct compound is illustrated as:

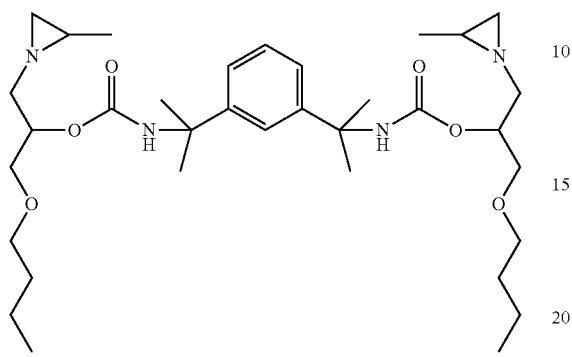

The calculated molecular weights of the theoretical main components was confirmed with Maldi-TOF-MS and are shown below with their structures:

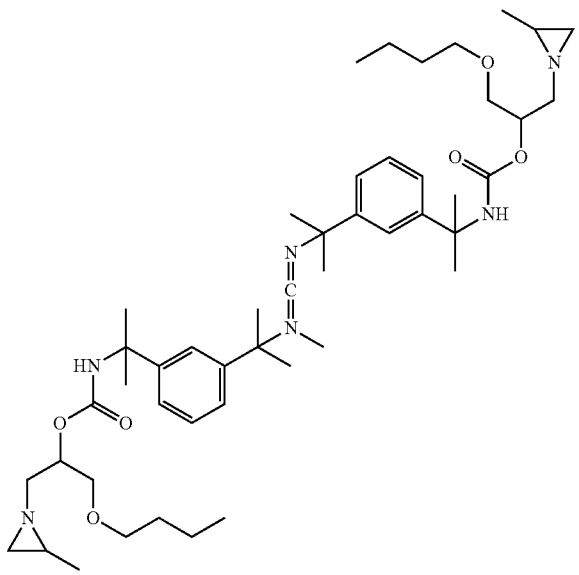

Calcd. [M+Na+]=841.56 Da; Obs. [M+Na+]=841.55 Da.

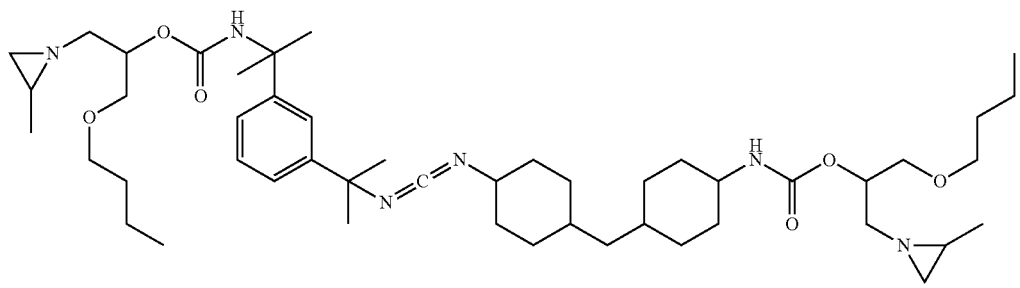 [SMILES: CCCCOCC(CN1CC1C)OC(=O)NC1CCC(CC2CCC(N=C=NC(C)(C)c3cccc(C(C)(C)NC(=O)OC(COCCCC)CN4CC4C)c3)CC2)CC1]

Calcd. [M+Na+]=859.60 Da; Obs. [M+Na+]=859.66 Da.

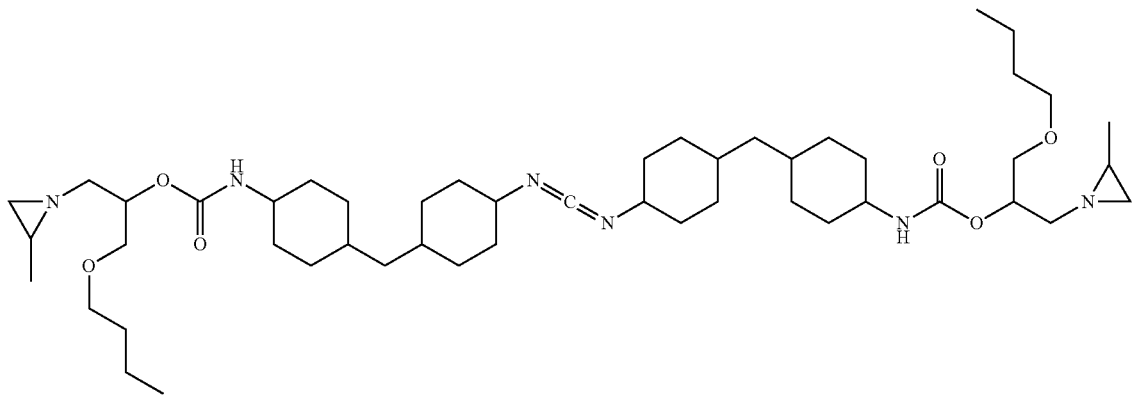 [SMILES: CCCCOCC(CN1CC1C)OC(=O)NC1CCC(CC2CCC(N=C=NC3CCC(CC4CCC(NC(=O)OC(COCCCC)CN5CC5C)CC4)CC3)CC2)CC1]

Calcd. [M+Na+]=877.65 Da; Obs. [M+Na+]=877.70 Da.

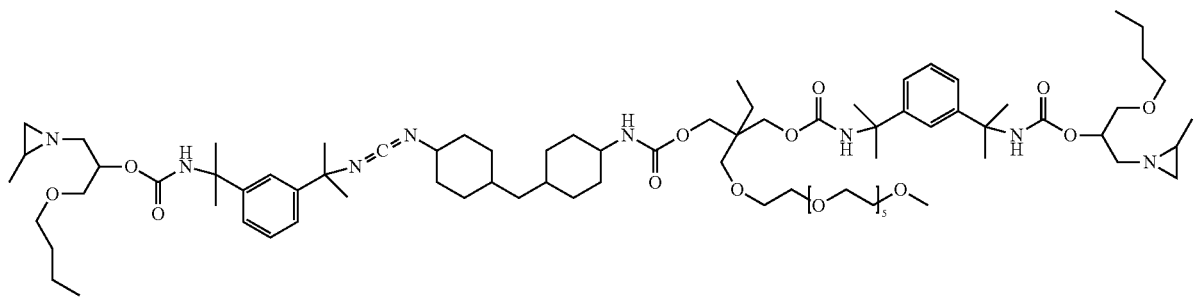

Calcd. [M+Na+]=1550.90 Da; Obs. [M+Na+]=1550.92 Da.

The following component with a mass below 600 Da was determined by LC-MS and quantified:

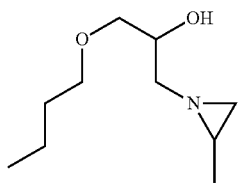

was present in the composition at less than 0.01 wt %.

Genotoxicity Test

| | Without S9 rat liver extract | | | | | | With S9 rat liver extract | | | | | |
|---|---|---|---|---|---|---|---|---|---|---|---|---|
| | Bscl 2 | | | Rtkn | | | Bscl 2 | | | Rtkn | | |
| | concentration | | | | | | | | | | | |
| | 10 | 25 | 50 | 10 | 25 | 50 | 10 | 25 | 50 | 10 | 25 | 50 |
| Example 2 | 1.1 | 1.5 | 1.7 | 1.2 | 1.3 | 1.3 | 1.2 | 1.5 | 1.7 | 1.2 | 1.3 | 1.3 |

All values in this table snow a negative induction level of the biomarkers of lower than a 2.0-fold induction at 10, 25 and 50% cytotoxicity in the absence and presence of rat S9 liver extract-based metabolizing systems and demonstrate that the crosslinker of example 2 shows weakly positive induction of genotoxicity.

EXAMPLE 3

Under a nitrogen atmosphere a mixture of 58.0 g (0.221 mole) Dicyclohexylmethane-4,4'-diisocyanate (H12MDI) and 0.58 g 3-methyl-1-phenyl-2-phospholene-1-oxide was heated while stirring to 150° C. The mixture was kept at 150° C. until NCO content was 16.4 wt %. Mixture was cooled to 80° C. and 53.04 g methoxypropyl acetate was added and stirred to homogeneous. 27.35 g Butylglycidylether/propylene imine adduct (0.146 mole) and 1 drop of dibutyltin dilaurate were added to the reaction mixture. The mixture was kept while stirring at 65° C. for 1 hour. 21.43 g (0.0286 mole) Poly(ethylene glycol) methyl ether average Mn 750 (MPEG 750) and a drop of dibutyltin dilaurate were added to the reaction mixture. The mixture was kept while stirring at 65° C. for 5 hours. FTIR showed a no isocyanate signal. 48.8 g methoxypropyl acetate was added. A yellow solution with a solid content of 50.0 wt % was obtained.

The reaction product is a mixture which contains a range of compounds having a structure according to claim 1.

This aziridine functional carbodiimide contains 1.4 meq per gram solids aziridine groups and 1.2 meq per gram solids carbodiimide groups resulting in a total of 2.6 meq acid reactive groups (i.e aziridine and carbodiimide functionality) per gram solids. The aziridine functional compound with the smallest (calculated) molar mass is the reaction product of butylglycidylether-propylene imine/H12MDI/butylglycidylether-propylene imine having a molar mass of 636.48

The structure of the smallest intrinsically formed aziridine functional byproduct compound is illustrated as:

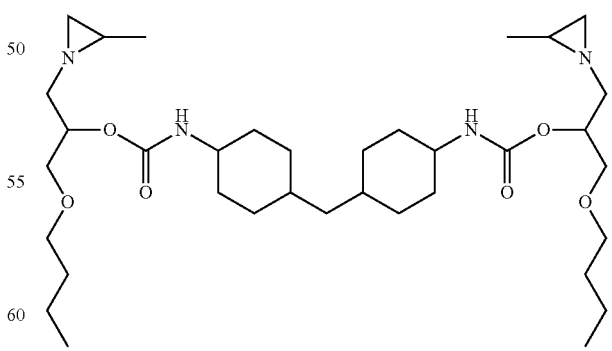

The calculated molecular weights of the theoretical main components was confirmed with Maldi-TOF-MS and are shown below with their structures:

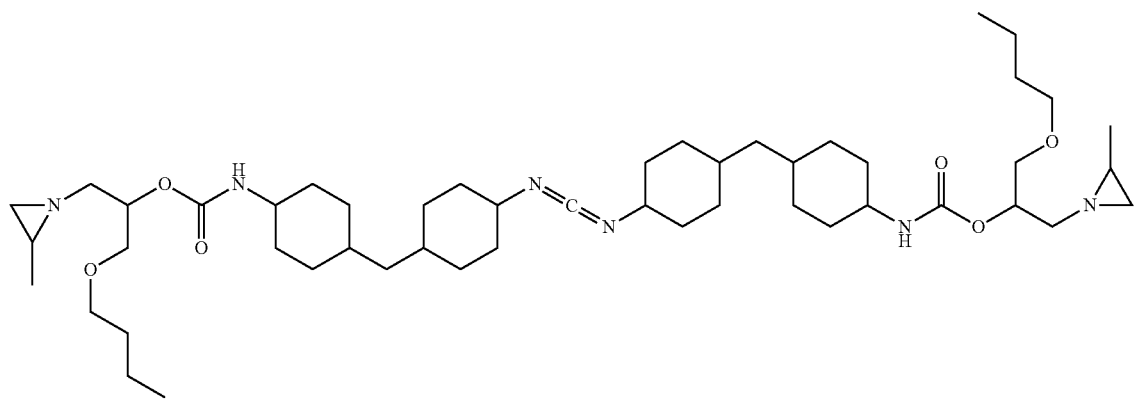 [SMILES: CCCCOCC(CN1CC1C)OC(=O)NC1CCC(CC2CCC(N=C=NC3CCC(CC4CCC(NC(=O)OC(COCCCC)CN5CC5C)CC4)CC3)CC2)CC1]
Calcd. [M+Na+]=877.65 Da; Obs. [M+Na+]=877.64 Da.
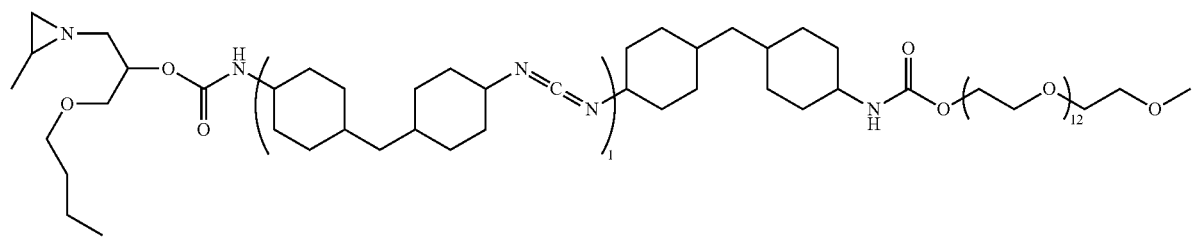
Calcd. [M+Na+]=1294.86 Da; Obs. [M+Na+]=1294.88 Da.
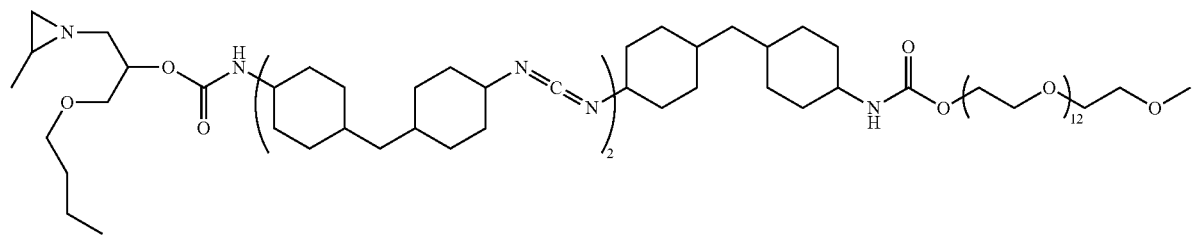
Calcd. [M+Na+]=1513.04 Da; Obs. [M+Na+]=1513.08 Da.
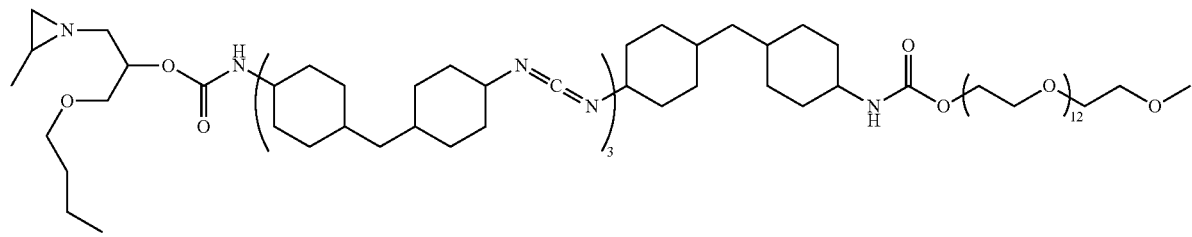

Calcd. [M+Na+]=1731.22 Da; Obs. [M+Na+]=1731.23 Da.

The following component with a mass below 600 Da was determined by LC-MS and quantified:

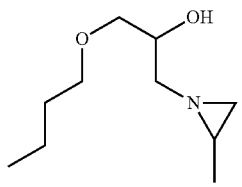

was present in the composition at less than 0.01 wt %.

Genotoxicity Test

|  | Without S9 rat liver extract | | | | | | With S9 rat liver extract | | | | | |
| --- | --- | --- | --- | --- | --- | --- | --- | --- | --- | --- | --- | --- |
|  | Bscl 2 | | | Rtkn | | | Bscl 2 | | | Rtkn | | |
|  concentration | | | | | | | | | | | | |
|  | 10 | 25 | 50 | 10 | 25 | 50 | 10 | 25 | 50 | 10 | 25 | 50 |
| Example 3 | 1.3 | 1.7 | 1.5 | 1.2 | 1.3 | 1.1 | 1.4 | 1.6 | 1.6 | 1.2 | 1.4 | 1.2 |

All values in this table show a negative induction level of the biomarkers of lower than a 2.0-fold induction at 10, 25 and 50% cytotoxicity in the absence and presence of rat S9 liver extract-based metabolizing systems and demonstrate that the crosslinker of example 3 shows weakly positive induction of genotoxicity.

EXAMPLE 4

Under a nitrogen atmosphere a mixture of 58.0 g (0.221 mole) Dicyclohexylmethane-4,4'-diisocyanate (H12MDI) and 0.58 g 3-methyl-1-phenyl-2-phospholene-1-oxide was heated while stirring to 150° C. The mixture was kept at 150° C. until NCO content was 16.4 wt %. Mixture was cooled to 80° C. and 53.04 g methoxypropyl acetate was added and stirred to homogeneous. 27.95 g Butylglycidylether/propylene imine adduct (0.149 mole) and 1 drop of dibutyltin dilaurate were added to the reaction mixture. The mixture was kept while stirring at 65° C. for 1 hour. 25.0 g (0.025 mole) Jeffamine® M-1000 (obtained from Huntsman) was added to the reaction mixture. The mixture was kept while stirring at 65° C. for 15 minutes. FTIR showed a no isocyanate signal. 53.0 g methoxypropyl acetate was added. A yellow solution with a solid content of 50.0 wt % was obtained.

The reaction product is a mixture which contains a range of compounds having a structure according to claim 1.

This aziridine functional carbodiimide contains 1.4 meq per gram solids aziridine groups and 1.1 meq per gram solids carbodiimide groups resulting in a total of 2.5 meq acid reactive groups (i.e aziridine and carbodiimide functionality) per gram solids. The aziridine functional compound with the smallest (calculated) molar mass is the reaction product of butylglycidylether-propylene imine/H12MDI/butylglycidylether-propylene imine having a molar mass of 636.48 of which the structure is illustrated in example 3.

The calculated molecular weights of the theoretical main components was confirmed with Maldi-TOF-MS and are shown below with their structures:

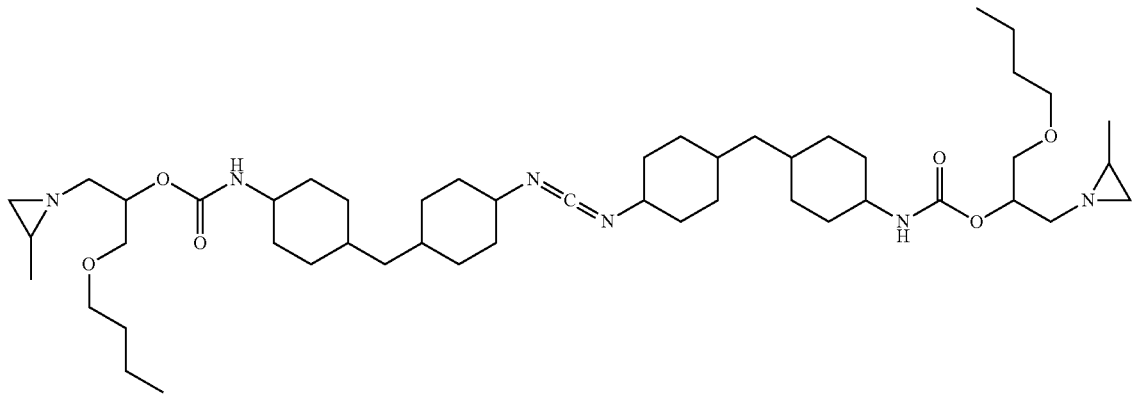 [SMILES: CCCCOCC(CN1CC1C)OC(=O)NC1CCC(CC2CCC(N=C=NC3CCC(CC4CCC(NC(=O)OC(COCCCC)CN5CC5C)CC4)CC3)CC2)CC1]

Calcd. [M+Na+]=877.65 Da; Obs. [M+Na+]=877.65 Da.

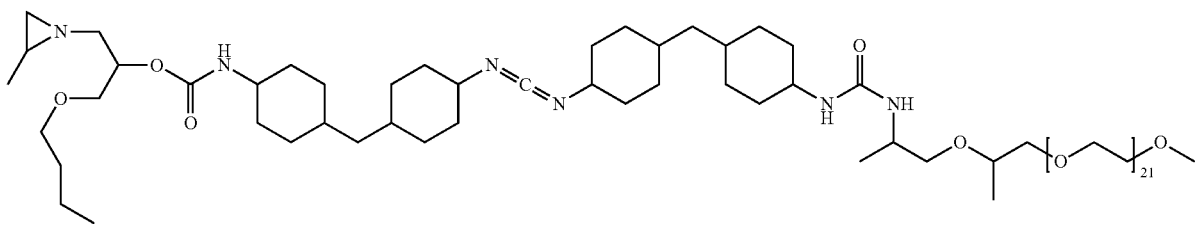

Calcd. [M+Na+]=1762.17; Obs. [M+Na+]=1762.20 Da.

The following component with a mass below 600 Da was determined by LC-MS and quantified:

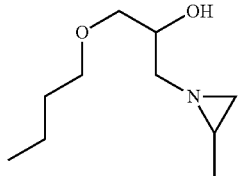

was present in the composition at less than 0.01 wt %.

Genotoxicity Test

|  | Without S9 rat liver extract | | | | | | With S9 rat liver extract | | | | | |
|---|---|---|---|---|---|---|---|---|---|---|---|---|
|  | Bscl 2 | | | Rtkn | | | Bscl 2 | | | Rtkn | | |
|  | concentration | | | | | | | | | | | |
|  | 10 | 25 | 50 | 10 | 25 | 50 | 10 | 25 | 50 | 10 | 25 | 50 |
| Example 4 | 1.2 | 1.6 | 1.4 | 1.1 | 1.3 | 1.2 | 1.3 | 1.6 | 1.6 | 1.1 | 1.4 | 1.3 |

The genotoxicity test results show that the crosslinker composition of Example 4 only has weakly positive induced genotoxicity

EXAMPLE 5

Under a nitrogen atmosphere a mixture of 80.4 g (0.306 mole) of Dicyclohexylmethane-4,4'-diisocyanate (H12MDI), 33.4 g (0.0668 mole) Poly(ethylene glycol) methyl ether average Mn 500 (MPEG 500) and 0.02 g Bismuth Neodecanoate was heated to 65° C. while stirring. After 1 hour of reacting at 65° C., 0.80 g 3-methyl-1-phenyl-2-phospholene-1-oxide was added to the mixture. The mixture was heated while stirring to 150° C. The mixture was kept at 150° C. until NCO content was 2.7 wt %. Mixture was cooled to 80° C. and 11.4 g Butylglycidylether/propylene imine adduct (0.061 mole) and 1 drop of dibutyltin dilaurate were added to the reaction mixture. The mixture was kept while stirring at 80° C. for 1 hour. 177.8 g water was slowly added to the mixture while stirring. Mixture was cooled to RT. 2.5 g of a 15 wt % solids potassiumhydroxide solution was added. A slightly hazy low viscous dispersion with a solid content of 39.3 wt % was obtained.

The reaction product is a mixture which contains a range of compounds having a structure according to claim 1.

This aziridine functional carbodiimide contains 0.5 meq aziridine groups per gram solids and 2.1 meq carbodiimide groups per gram solids resulting in a total of 2.6 meq acid reactive groups (i.e aziridine and carbodiimide functionality) per gram solids. The aziridine functional compound with the smallest (calculated) molar mass is the reaction product of butylglycidylether-propylene imine/H12MDI/butylglycidylether propylene imine having a molar mass of 636.48 of which the structure is illustrated in example 3.

The calculated molecular weights of the theoretical main components was confirmed with Maldi-TOF-MS and are shown below with their structures:

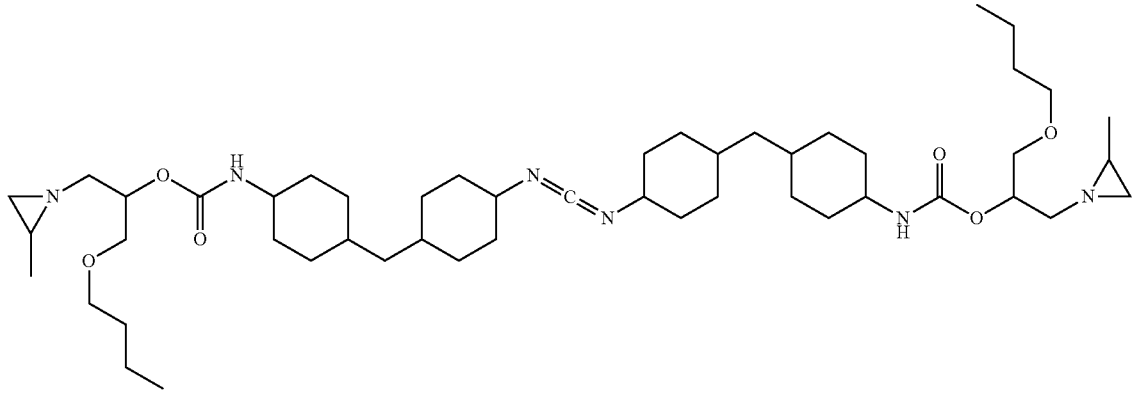 [SMILES: CCCCOCC(CN1CC1C)OC(=O)NC1CCC(CC2CCC(N=C=NC3CCC(CC4CCC(NC(=O)OC(COCCCC)CN5CC5C)CC4)CC3)CC2)CC1]

Calcd. [M+Na+]=877.65 Da; Obs. [M+Na+]=877.64 Da.

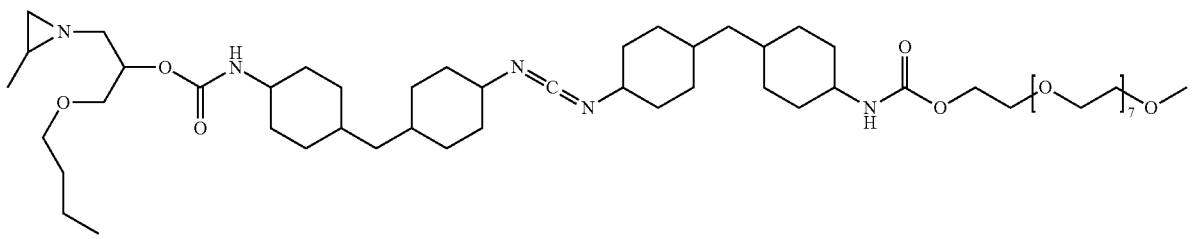

Calcd. [M+Na+]=1074.73 Da; Obs. [M+Na+]=1074.72 Da.

The following component with a mass below 600 Da was determined by LC-MS and auantified:

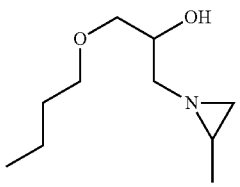

was present in the composition at less than 0.01 wt %.

Genotoxicity Test

|  | Without S9 rat liver extract | | | | | | With S9 rat liver extract | | | | | |
| --- | --- | --- | --- | --- | --- | --- | --- | --- | --- | --- | --- | --- |
|  | Bscl 2 | | | Rtkn | | | Bscl 2 | | | Rtkn | | |
|  | concentration | | | | | | | | | | | |
|  | 10 | 25 | 50 | 10 | 25 | 50 | 10 | 25 | 50 | 10 | 25 | 50 |
| Example 5 | 1.3 | 1.5 | 1.4 | 0.8 | 0.8 | 0.7 | 1.4 | 1.4 | 1.4 | 1.0 | 0.9 | 0.7 |

The genotoxicity test results show that the crosslinker composition of Example 5 is non-genotoxic.

Test Results of the Crosslinkers

Synthesis of P1, a Waterborne Polyurethane

A one-liter flask (equipped with a thermometer and an overhead stirrer), was charged with 29.9 grams of dimethylol propionic acid, 282.1 grams of a polypropylene glycol with a calculated average molecular weight (M) of 2000 Da and an OH-value of 56±2 mg KOH/g polypropylene glycol), 166.5 grams of a polypropylene glycol with a calculated average molecular weight (M) of 1000 Da and an OH-value of 112±2 mg KOH/g polypropylene glycol, and 262.8 grams of isophorone diisocyanate (the average molecular weight of each of the polyols is calculated from its OH-value according to the equation: M=2*56100/[OH-value in mg KOH/g polypropylene glycol). The reaction mixture was placed under $N_2$ atmosphere, heated to 50° C. and subsequently 0.07 g dibutyltin dilaurate were added to the reaction mixture. An exothermic reaction was observed; however proper care was taken in order for the reaction temperature not to exceed 97° C. The reaction was maintained at 95° C. for an hour. The NCO content of the resultant polyurethane P1' was 7.00% on solids as determined according to the ISO 14896 Method A (year 2009) (theoretically 7.44%) and the acid value of the polyurethane P1' was 16.1±1 mg KOH/g polyurethane P1'. The polyurethane P1' was cooled down to 60° C. and 18.7 grams of triethylamine were added, and the resulting mixture was stirred for 30 minutes. Subsequently, an aqueous dispersion of the polyurethane P1' (the aqueous dispersion of the polyurethane P1' is further referred to as P1) was prepared as follows: the thus prepared mixture of the polyurethane P1' and triethylamine was fed—at room temperature over a time period of 60 minutes—to a mixture of 1100 grams of demineralized water, 19.5 grams of nonylphenol ethoxylate (9 ethoxylate groups), and 4.0 grams of triethylamine. After the feed was completed, the mixture was stirred for additional 5 minutes, and subsequently 111.2 grams of hydrazine (16 wt % solution in water) were added to the mixture. The aqueous dispersion of the polyurethane P1' thus prepared was stirred for an additional 1 h and P1 was obtained.

Synthesis of A1, a Waterborne Acrylic Binder

A 2 L four-necked flask equipped with a thermometer and overhead stirrer was charged with sodium lauryl sulphate (30% solids in water, 18.6 grams of solution) and demineralized water (711 grams). The reactor phase was placed under N2 atmosphere and heated to 82° C. A mixture of demineralized water (112 grams), sodium lauryl sulphate (30% solids in water, 37.2 grams of solution), methyl methacrylate (174.41 grams), n-butyl acrylate (488.44 grams) and methacrylic acid (34.88 grams) was placed in a large feeding funnel and emulsified with an overhead stirrer (monomer feed). Ammonium persulphate (1.75 grams) was dissolved in demineralized water (89.61 grams) and placed in a small feeding funnel (initiator feed). Ammonium persulphate (1.75 grams) was dissolved in demineralized water (10.5 grams), and this solution was added to the reactor phase. Immediately afterwards, 5% by volume of the monomer feed was added to the reactor phase. The reaction mixture then exothermed to 85° C. and was kept at 85° C. for 5 minutes. Then, the residual monomer feed and the initiator feed were fed to the reaction mixture over 90 minutes, maintaining a temperature of 85° C. After completion of the feeds, the monomer feed funnel was rinsed with demineralized water (18.9 grams) and reaction temperature maintained at 85° C. for 45 minutes. Subsequently, the mixture was cooled to room temperature and brought to pH=7.2 with ammonia solution (6.25 wt. % in demineralized water), and brought to 40% solids with further demineralized water and A1 was obtained.

Both binders and the crosslinkers were combined in a stoichiometric ratio typically ranging from 0.25 to 1.0 stoichiometric amounts, this is the total amount of carboxylic acid reactive groups (i.e aziridine and carbodiimide functionality) versus the amount of carboxylic acid groups. The crosslinker was diluted 50/50 with water prior to adding to the binder. The effect of addition of the crosslinker is assessed by using spot tests on coating surfaces, based on procedures from the DIN 68861-1:2011 standard. The coating compositions were filtered and applied to Leneta test cards using 100 μm wire rod applicators. The films were then dried according to the conditions described below. Subsequently, a piece of cotton wool was soaked in 1:1 EtOH: demineralized water and placed on the film for 1 and 4 hours. Similarly, a water spot test was placed on the film for 16 hours. After removal of the cotton wool respectively spot liquid and 60 minutes recovery, the following results were obtained (a score of 0 indicates complete degradation of the film, 5 indicates no damage visible):

Test results after 1 day drying at 23±2° C. (stoichiometric amounts acid reactive groups crosslinker versus acid groups binder is 0.93):

| Binder type | Binder amount (grams) | Cross-linker type | Cross-linker amount (grams) | Water (grams) | EtOH 50% (1 hr) | EtOH 50% (4 hrs) | Water (16 hrs) |
| --- | --- | --- | --- | --- | --- | --- | --- |
| P1 | N/A | No cross-linker | N/A |  | 1 | 1 | 1 |
| P1 | 49.5 | Comparative Example 1 | 0.8 |  | 4 | 4 | 4 |
| P1 | 46.2 | Comparative Example 2 | 3.0 | 3.0 | 4 | 4 | 4 |
| P1 | 34.8 | Example 1 | 3.0 | 3.0 | 4 | 4 | 4 |
| P1 | 15.0 | Example 2 | 1.2 | 1.2 | 4 | 3 | 5 |

-continued

| Binder type | Binder amount (grams) | Cross-linker type | Cross-linker amount (grams) | Water (grams) | EtOH 50% (1 hr) | EtOH 50% (4 hrs) | Water (16 hrs) |
|---|---|---|---|---|---|---|---|
| P1 | 15.0 | Example 3 | 1.2 | 1.2 | 4 | 3 | 4 |
| P1 | 15.0 | Example 4 | 1.2 | 1.2 | 4 | 3 | 4 |
| P1 | 15.0 | Example 5 | 1.5 | 1.5 | 4 | 3 | 4 |
| A1 |  | No cross-linker |  |  | 1 | 1 | 1 |
| A1 | 23.8 | Comparative Example 1 | 0.8 |  | 4 | 4 | 4 |
| A1 | 22.9 | Comparative Example 2 | 3.0 | 3.0 | 4 | 4 | 4 |
| A1 | 17.3 | Example 1 | 3.0 | 3.0 | 4 | 4 | 4 |

Test results after 1 day drying at 23±2° C., overnight annealing at 80° C. and further drying for 1 day at 23±2° C. (stoichiometric amounts acid reactive groups crosslinker versus acid groups binder is 0.93):

| Binder type | Binder amount (grams) | Cross-linker type | Cross-linker amount (grams) | Water (grams) | EtOH 50% (1 hr) | EtOH 50% (4 hrs) | Water (16 hrs) |
|---|---|---|---|---|---|---|---|
| P1 | N/A | No cross-linker | N/A |  | 3 | 3 | 3 |
| P1 | 49.5 | Comparative Example 1 | 0.8 |  | 4 | 4 | 4 |
| P1 | 46.2 | Comparative Example 2 | 3.0 | 3.0 | 4 | 4 | 4 |
| P1 | 34.8 | Example 1 | 3.0 | 3.0 | 4 | 4 | 4 |
| A1 |  | No cross-linker |  |  | 1 | 1 | 1 |
| A1 | 23.8 | Comparative Example 1 | 0.8 |  | 4 | 4 | 4 |
| A1 | 22.9 | Comparative Example 2 | 3.0 | 3.0 | 5 | 5 | 5 |
| A1 | 17.3 | Example 1 | 3.0 | 3.0 | 5 | 5 | 5 |

The invention claimed is:

1. An aziridine compound having:
   a) one or two of the following structural units A:

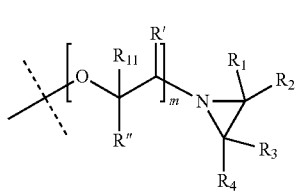

(A)

wherein
$R_1$ is H;
$R_2$ and $R_4$ are independently chosen from H or an aliphatic hydrocarbon group containing from 1 to 4 carbon atoms;
$R_3$ is an aliphatic hydrocarbon group containing from 1 to 4 carbon atoms;

R' and R" are according to (1) or (2):
   (1) R'=H or an aliphatic hydrocarbon group containing from 1 to 14 carbon atoms, and
   R"=an aliphatic hydrocarbon group containing from 5 to 14 carbon atoms, a cycloaliphatic hydrocarbon group containing from 5 to 12 carbon atoms, an aromatic hydrocarbon group containing from 6 to 12 carbon atoms, $CH_2$-O—(C=O)-R'', $CH_2$-O-R'''', or $CH_2$-$(OCR''''HCR''''H)_n$-OR''''', whereby R''' is an aliphatic hydrocarbon group containing from 4 to 14 carbon atoms and R'''' is an aliphatic hydrocarbon group containing from 1 to 14 carbon atoms or an aromatic hydrocarbon group containing from 6 to 12 carbon atoms, n being from 1 to 35, R'''' independently being H or an aliphatic hydrocarbon group containing from 1 to 14 carbon atoms and R''''' being an aliphatic hydrocarbon group containing from 1 to 4 carbon atoms,
   (2) R' and R" form together a saturated cycloaliphatic hydrocarbon group containing from 5 to 8 carbon atoms,
$R_{11}$ is H or an aliphatic hydrocarbon group containing from 1 to 14 carbon atoms, m is an integer from 1 to 6;

b) one structural unit B:

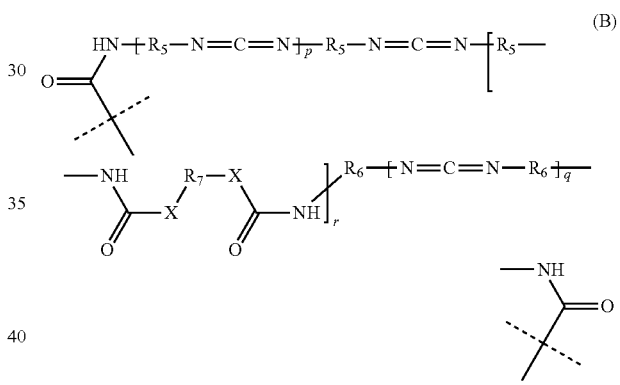

(B)

wherein
p+q is an integer from 0 to 4;
r is an integer from 0 to 2;
X is NH or O or NR, wherein R contains at most 36 carbon atoms and optionally contains one or more heteroatoms in the chain;
$R_5$ and $R_6$ are independently containing from 4 to 13 carbon atoms;
$R_7$ is a divalent group; and c) optionally one structural unit C:

(C)

wherein
Z is NH or O or NR wherein R contains at most 36 carbon atoms and optionally contains one or more heteroatoms in the chain;

$R_8$ is a monovalent group; and d) structural formula A-B-A or structural formula A-B-C;

e) a molecular weight higher than 600 Daltons and at most 5000 Daltons, determined using MALDI-TOF mass spectroscopy; with the proviso that f) the mathematical sum of the molar mass of starting diisocyanate which provides carbodiimide functionality in the structural unit B+the molar mass of structural unit A+the molar mass of structural unit A is higher than 600 Daltons; and g) in case structural unit C is present, the mathematical sum of the molar mass of the starting diisocyanate which provides the carbodiimide functionality in the structural unit B+the molar mass of structural unit A+the molar mass of structural unit C is higher than 600 Daltons.

2. The aziridine compound according to claim 1, wherein $R_1$ is H, $R_2$ is H, $R_3$ is $CH_3$ and $R_4$ is H.

3. The aziridine compound according to claim 1, wherein $R_{11}$ is H or methyl.

4. The aziridine compound according to claim 1, wherein m is 1.

5. The aziridine compound according to claim 1, wherein p+q is an integer from 0 to 2.

6. The aziridine compound according to claim 1, wherein r is 0 or 1.

7. The aziridine compound according to claim 1, wherein $R_5$ and $R_6$ are the hydrocarbon residue from a diisocyanate used to form the carbodiimide functionalities present in structural unit B and $R_5=R_6$.

8. The aziridine compound according to claim 1, wherein X is O and Z is NH or O.

9. The aziridine compound according to claim 1, wherein $R_7$ is a polyether with an average molecular weight of from 194 to 1300 Daltons and contains more than 80 wt. % ethoxylated groups.

10. The aziridine compound according to claim 1, wherein $R_8$ is a polyether with an average molecular weight of from 500 to 1500 Daltons and contains more than 80 wt. % ethoxylated groups.

11. The aziridine compound according to claim 1, wherein the mathematical sum of the molar mass of starting diisocyanate providing carbodiimide functionality in the structural unit B+the molar mass of structural unit A+the molar mass of structural unit A is higher than 615 Daltons, and, in case structural unit C is present, the mathematical sum of the molar mass of starting diisocyanate providing carbodiimide functionality in the structural unit B+the molar mass of structural unit A+the molar mass of structural unit C is higher than 615 Daltons.

12. The aziridine compound according to claim 1, wherein the aziridine compound has a molecular weight of at most 3000 Daltons, and the molecular weight of the compound is at least 700 Daltons.

13. The aziridine compound according to claim 1, wherein the aziridine compound has an aziridine equivalent weight of at least 350 and at most 5000 Daltons.

14. The aziridine compound according to claim 1, wherein the structural unit A is obtained by reacting at least a monoepoxide compound with an aziridine with the following structural formula:

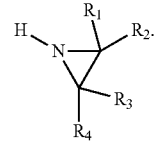

15. The aziridine compound according to claim 14, wherein the monoepoxide compound is selected from the group consisting of n-butylglycidylether (CAS number 2426-8-6), 2-ethylhexylglycidylether (CAS number 2461-15-6), glycidyl neodecanoate (CAS number 26761-45-5) and any mixture thereof.

16. A process for preparing the aziridine compound according to claim 1, wherein the aziridine compound is obtained by reacting a compound with the following structural formula (D)

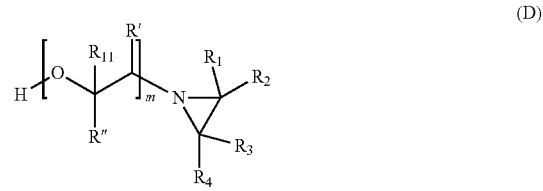

and diisocyanate with formula O=C=N-$R_{10}$-N=C=O (E), wherein $R_{10}$ is $R_5$ or $R_6$ and optionally diol, diamine and/or hydroxylamine with formula HX-$R_7$-XH (F) and, in case the compound has structural formula A-B-C, compound G HZ-$R_8$ (G).

17. The process according to claim 16, wherein the diisocyanate is isophorone diisocyanate IPDI, 4,4'-dicyclohexyl methane diisocyanate H12MDI and/or tetramethylxylene diisocyanate TMXDI.

18. A crosslinker composition comprising at least one aziridine compound according to claim 1 and comprising at most 1 wt. % of aziridinyl group functional molecules having a molar mass of lower than 600 Daltons.

19. The crosslinker composition according to claim 18, wherein the composition is an aqueous dispersion comprising particles of the aziridine compound.

* * * * *